United States Patent
Xie et al.

(10) Patent No.: US 11,385,903 B2
(45) Date of Patent: Jul. 12, 2022

(54) FIRMWARE UPDATE PATCH

(71) Applicant: Microsoft Technology Licensing, LLC, Redmond, WA (US)

(72) Inventors: Daini Xie, Redmond, WA (US); Thirupathaiah Annapureddy, Redmond, WA (US); Mallik Bulusu, Bellevue, WA (US); Muhammad Ashfaq Ahmed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 16/874,276

(22) Filed: May 14, 2020

(65) Prior Publication Data

US 2021/0240489 A1 Aug. 5, 2021

Related U.S. Application Data

(60) Provisional application No. 62/970,030, filed on Feb. 4, 2020.

(51) Int. Cl.
*G06F 9/4401* (2018.01)
*G06F 21/57* (2013.01)
(Continued)

(52) U.S. Cl.
CPC ............ *G06F 9/4406* (2013.01); *G06F 8/654* (2018.02); *G06F 9/4411* (2013.01); *G06F 9/544* (2013.01);
(Continued)

(58) Field of Classification Search
CPC ...... G06F 9/4406; G06F 8/654; G06F 9/4411; G06F 9/544; G06F 21/572; G06F 21/64
(Continued)

(56) References Cited

U.S. PATENT DOCUMENTS 6,418,498 B1   7/2002  Martwick
6,615,365 B1 *  9/2003  Jenevein ............. G06F 11/1417
                                              711/161

(Continued)

OTHER PUBLICATIONS

"International Search Report and Written Opinion Issued in PCT Application No. PCT/US21/014029", dated Jul. 9, 2021, 16 Pages.
(Continued)

*Primary Examiner* — Paul R. Myers
(74) *Attorney, Agent, or Firm* — Holzer Patel Drennan

(57) ABSTRACT

A computing system is provided, including a processor and memory storing instructions that, when executed, cause the processor to store a firmware update patch in a runtime buffer included in the memory. The runtime buffer may be accessible by firmware and an operating system of the computing system. The processor may perform a first verification check on the firmware update patch. When the firmware update patch passes the first verification check, the processor may copy the firmware update patch to a system management random access memory (SMRAM) buffer included in the memory. The SMRAM buffer may be accessible by the firmware and inaccessible by the operating system. The processor may perform a second verification check on the copy of the firmware update patch. When the copy of the firmware update patch passes the second verification check, the processor may execute the copy of the firmware update patch.

20 Claims, 14 Drawing Sheets

(51) Int. Cl.
*G06F 8/654* (2018.01)
*G06F 21/64* (2013.01)
*G06F 9/54* (2006.01)

(52) U.S. Cl.
CPC ............ *G06F 21/572* (2013.01); *G06F 21/64* (2013.01); *G06F 2221/0751* (2013.01)

(58) Field of Classification Search
USPC .......................................................... 713/2
See application file for complete search history.

(56) References Cited

U.S. PATENT DOCUMENTS

| | | | | |
|---|---|---|---|---|
| 7,454,547 | B1* | 11/2008 | Nallagatla | G06F 9/4484 710/260 |
| 9,176,752 | B1 | 11/2015 | Marr et al. | |
| 10,104,185 | B1* | 10/2018 | Sharifi Mehr | H04L 41/0896 |
| 2003/0196096 | A1* | 10/2003 | Sutton | G06F 21/572 713/181 |
| 2004/0098715 | A1* | 5/2004 | Aghera | G06F 8/65 717/173 |
| 2004/0199911 | A1* | 10/2004 | Lo | G06F 8/654 717/171 |
| 2006/0075001 | A1* | 4/2006 | Canning | G06F 8/65 |
| 2007/0143528 | A1* | 6/2007 | Przybylek | G11C 16/105 711/103 |
| 2008/0104132 | A1* | 5/2008 | Toner | G06F 16/119 |
| 2008/0222449 | A1 | 9/2008 | Ramgarajan et al. | |
| 2009/0144538 | A1* | 6/2009 | Duda | G06F 8/65 713/2 |
| 2009/0172372 | A1 | 7/2009 | Kumar et al. | |
| 2010/0031366 | A1* | 2/2010 | Knight | H04W 4/24 726/26 |
| 2011/0055469 | A1 | 3/2011 | Natu et al. | |
| 2011/0252413 | A1* | 10/2011 | Maeda | G06F 8/66 717/168 |
| 2011/0271268 | A1* | 11/2011 | Dang | G06F 9/4486 717/168 |
| 2013/0031538 | A1* | 1/2013 | Skalsky | G06F 21/572 717/168 |
| 2016/0180099 | A1 | 6/2016 | Potlapally et al. | |
| 2017/0090909 | A1* | 3/2017 | Guo | G06F 21/57 |
| 2017/0242598 | A1 | 8/2017 | Nijhawan et al. | |
| 2018/0032349 | A1* | 2/2018 | Bhimanadhuni | G06F 9/4406 |
| 2019/0042752 | A1* | 2/2019 | Mihm | G06F 9/4401 |
| 2019/0243634 | A1 | 8/2019 | Lewis | |
| 2020/0082088 | A1* | 3/2020 | Muthukumaran | H04L 9/0866 |
| 2020/0257521 | A1* | 8/2020 | Jayakumar | G06F 8/656 |
| 2020/0364041 | A1 | 11/2020 | Bulusu et al. | |

OTHER PUBLICATIONS

"Invitation to Pay Additional Fee Issued in PCT Application No. PCT/US2021/014029", dated May 18, 2021, 12 Pages.

Viega, et al., "Building Secure Software: Race Conditions", Retrieved From: https://www.informit.com/articles/article.aspx?p=23947&seqNum=3, Nov. 2, 2001, 5 Pages.

"International Search Report and Written Opinion Issued in PCT Application No. PCT/US20/028597", dated Jul. 3, 2020, 14 Pages.

"Unified Extensible Firmware Interface (UEFI) Framework UEFI Overview", Retrieved from: https://software.intel.com/sites/default/files/m/4/1/c/3/e/40434-Unified_Extensible_Firmware_Interface_28UEFI_29_Framework_Overview.pptx, Retrieved Date: Apr. 23, 2020, 43 Pages.

"Unified Extensible Firmware Interface Forum", Retrieved from: http://web.archive.org/web/20200109232652/https://uefi.org/specifications, Jan. 9, 2020, 4 Pages.

Regenscheid, Andrew, "BIOS Protection Guidelines for Servers", In NIST Special Publication 800-147B, Aug. 2014, 32 Pages.

Rosenbaum, et al., "A Tour Beyond BIOS into UEFI Secure Boot", In White Paper of Intel, Jul. 2012, 49 Pages.

Svoboda, David, "SEI CERT C Coding Standard", Retrieved from: https://wiki.sei.cmu.edu/confluence/display/c/SEI+CERT+C+Coding+Standard, Dec. 5, 2018, 3 Pages.

Yao, et al., "A Tour Beyond BIOS—Capsule Update and Recovery in EDK II", In White Paper of Intel, Dec. 2016, 43 Pages.

Yao, et al., "A Tour Beyond BIOS—Security Design Guide in EDK II", In White Paper of Intel, Sep. 2016, 33 Pages.

Yao, et al., "A Tour Beyond BIOS—Security Enhancement to Mitigate Buffer Overflow in UEFI", In White Paper of Intel, Oct. 2016, 43 Pages.

Yao, et al., "A Tour Beyond BIOS Memory Map and Practices in UEFI BIOS", In White Paper of Intel, Jan. 31, 2016, 40 Pages.

Yao, et al., "A Tour Beyond BIOS Secure SMM Communication in the EFI Developer Kit II", In White Paper of Intel, Apr. 26, 2016, 32 Pages.

"Non Final Office Action Issued in U.S. Appl. No. 16/532,277", dated Oct. 6, 2021, 22 Pages.

De Souza, et al., "SMM-Based Hypervisor Integrity Measurement", In Proceedings of the IEEE 2nd International Conference on Cyber Security and Cloud Computing, Nov. 3, 2015, pp. 362-367.

"Final Office Action Issued in U.S. Appl. No. 16/532,277", dated Feb. 1, 2022, 21 Pages.

* cited by examiner

US 11,385,903 B2

FIRMWARE UPDATE PATCH

CROSS REFERENCE TO RELATED APPLICATIONS

This application claims priority to U.S. Provisional Patent Application Ser. No. 62/970,030, filed Feb. 4, 2020, the entirety of which is hereby incorporated herein by reference for all purposes.

BACKGROUND

The firmware of a computing device manages the functions of the hardware components included in the computing device. For example, the firmware may be a Basic Input/Output System (BIOS). The firmware of a computing device may sometimes be updated in order to make changes such as fixing security flaws, adjusting hardware settings, fixing bugs in firmware functionality, enhancing reliability and serviceability features, or enabling or disabling hardware components. The computing device at which the firmware update is performed may be a server computing device included in a data center.

SUMMARY

According to one aspect of the present disclosure, a computing system is provided, including a processor and memory storing instructions that, when executed, cause the processor to store a firmware update patch in a runtime buffer included in the memory. The runtime buffer may be accessible by firmware and an operating system of the computing system. The instructions may further cause the processor to perform a first verification check on the firmware update patch stored in the runtime buffer. When the firmware update patch passes the first verification check, the instructions may further cause the processor to copy the firmware update patch to a system management random access memory (SMRAM) buffer included in the memory. The SMRAM buffer may be accessible by the firmware and inaccessible by the operating system. The instructions may further cause the processor to perform a second verification check on the copy of the firmware update patch stored in the SMRAM buffer. When the copy of the firmware update patch passes the second verification check, the instructions may further cause the processor to execute the copy of the firmware update patch.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

When a firmware update is performed at a server computing device located in a data center, it is typically desirable to avoid server downtime and overhead associated with transferring processes to other server computing devices. However, existing methods of updating the firmware of a computing device typically include rebooting the server computing device. In addition, such existing methods typically replace the entire BIOS with an updated version of the BIOS. Since the file size of the BIOS may be large, reinstalling the BIOS when performing an update to the firmware may be time-consuming. In some instances, the firmware update may be applied to each server computing device in the data center, such as when the firmware update fixes a major security vulnerability. In such scenarios, updating the firmware of the server computing devices using existing methods may be a costly process that significantly interrupts server availability.

Existing BIOS updates are typically expected to run only once and not be replayed. BIOS vendors typically package changes to multiple different features of the BIOS into single updates that replace the entire BIOS when installed. These packaged BIOS updates are also not version-aware and do not support uninstallation or modular updating. Thus, packaged BIOS updates made using existing updating techniques are not conducive to low-impact updates in which server computing devices are kept running while their firmware is updated.

In addition, when firmware updates are performed according to existing techniques, the BIOS of the server computing device may be vulnerable to having malicious code inserted via a time-of-check-time-of-use (TOC-TOU) attack. In a TOC-TOU attack, the malicious code may initially be running on a core of the processor of the server computing device. When a firmware update is performed, one core (referred to as the monarch core) of the processor may be used to service the interrupt while the other cores of the processor are halted. During the interrupt, the cores of the processor are halted at different times. Thus, a race condition may occur in which the monarch core begins servicing a system management interrupt before one or more other cores have halted. Within the window of time before all the cores have halted, malicious code running in the operating system may edit the code of the firmware update.

TOC-TOU attacks may also be attempted during a firmware update using a malicious hardware attached to the server computing device. When a TOC-TOU attack is made using malicious hardware, the malicious hardware device may perform a direct memory access (DMA) transfer to modify the code of the firmware update while the monarch core of the processor is servicing the update.

Figure 1:
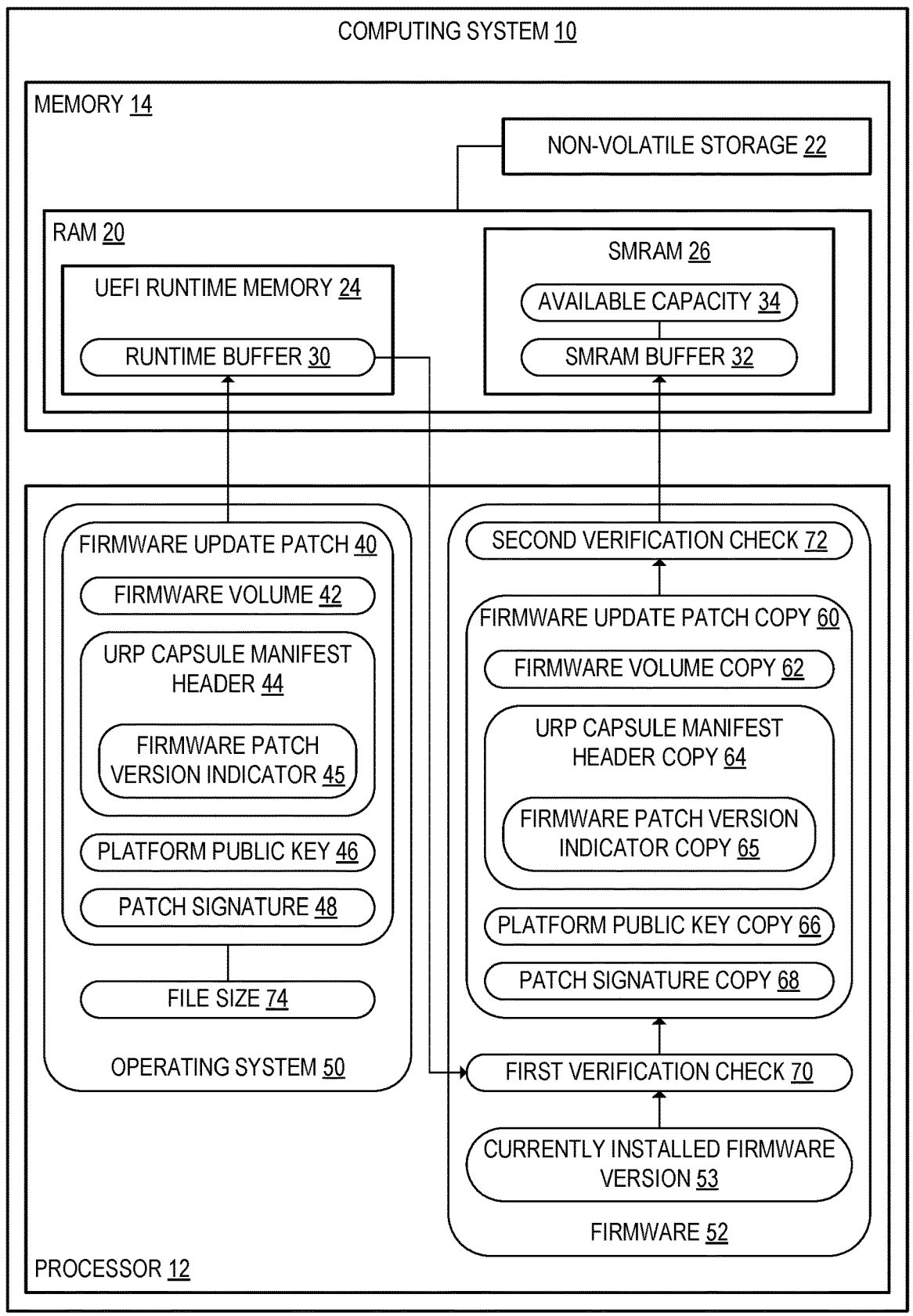
FIG. 1 schematically shows an example computing system at which an operating system and firmware are executed, according to one example embodiment.

In order to overcome the above shortcomings of existing firmware updating techniques, a computing system 10 is provided, as shown in the example of FIG. 1. The computing system 10 may include a processor 12. The processor 12 may include a plurality of processor cores on which one or more processor threads may be executed. The computing system 10 may further include memory 14 that may be operatively coupled to the processor 12 such that the processor 12 may store data in the memory 14 and retrieve data from the memory 14. The memory 14 may include Random Access Memory (RAM) 20 and may further include non-volatile storage 22. The non-volatile storage 22 may store instructions configured to be executed by the processor 12.

In some embodiments, the functions of the processor 12 and the memory 14 may be instantiated across a plurality of operatively coupled computing devices. For example, the computing system 10 may be a server computing device operatively coupled to one or more other computing devices in a data center. Each of the operatively coupled computing devices may perform some or all of the functions of the processor 12 or memory 14 discussed below.

The processor 12 may be configured to execute an operating system 50 in which one or more application programs may be executed. The processor 12 may be further configured to execute firmware 52, such as a Basic Input/Output System (BIOS) or a Unified Extensible Framework Interface (UEFI). As discussed above, the firmware 52 may be configured to manage the functions of, and interactions between, the hardware devices included in the computing system 10, which may include the processor 12 and/or the memory 14. The firmware 52 may further include settings of one or more additional hardware devices operatively coupled to processor 12 and/or the memory 14 of the computing system 10, such as one or more input devices, one or more output devices, or one or more networking devices. Instructions for executing the operating system 50 and/or the firmware 52 may be stored in the non-volatile storage 22.

The memory 14 may store instructions that, when executed, cause the processor 12 to store a firmware update patch 40 in a runtime buffer 30 included in the memory 14. The instructions may be included in the non-volatile storage 22. The runtime buffer 30 may be included in UEFI runtime memory 24, which may be included in the RAM 20 and configured to read and/or written to by both the operating system 50 and the firmware 52. Thus, the runtime buffer 30 may be accessible by both the firmware 52 and the operating system 50 of the computing system 10.

The firmware update patch 40 may include a plurality of code instructions to modify the firmware 52 of the computing system 10. The firmware update patch 40 may, for example, be received from another server computing device. In some embodiments, the firmware update patch 40 may be a UEFI runtime patch (URP) capsule including a firmware volume 42, a URP capsule manifest header 44, a platform public key 46, and a patch signature 48. The firmware volume 42 may include the code instructions to modify the firmware 52 and may be stored as a block of memory having a predefined size. For example, the firmware volume 42 may have a size between 64 KB and 2 MB. The URP capsule manifest header 44 may, for example, be appended at the end of the firmware volume 42 and may include metadata such as a capsule type, a signing key length, a base BIOS version, and a URP capsule version number of the URP capsule. In this example, the platform public key 46 may be appended after the URP capsule manifest header 44. The patch signature 48 may be a URP capsule signature and may be appended after the platform public key 46. In some embodiments, the patch signature 48 may be assigned to the URP capsule by another server computing device. In other embodiments, the firmware volume 42, the URP capsule manifest header 44, the platform public key 46, and/or the patch signature 48 may be included in the firmware update patch 40 in some other order. Additionally or alternatively, other data may be further included in the firmware update patch 40.

Figure 2:
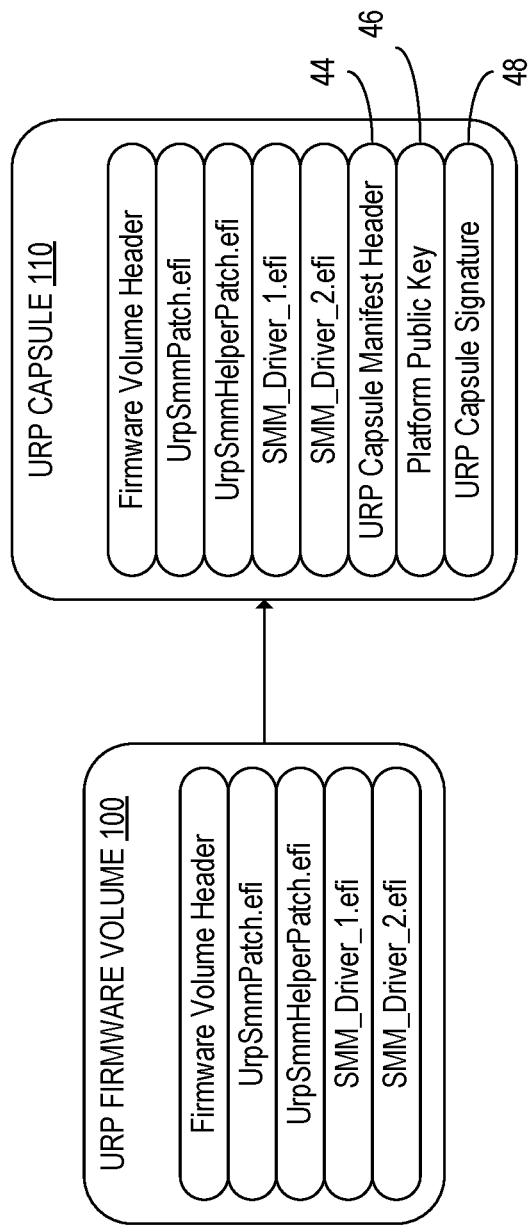
FIG. 2 shows an example Unified Extensible Framework Interface (UEFI) runtime patch (URP) capsule including a firmware volume, according to the embodiment of FIG. 1.

FIG. 2 shows an example of a URP firmware volume 100 and URP capsule 110 formed from the URP firmware volume 100 according to the embodiment of FIG. 1. The URP firmware volume 100 shown in FIG. 2 includes a firmware volume header and a plurality of .efi files including UrpSmmPatch.efi, UrpSmmHelperPatch.efi, SMM_Driver_1.efi, and SMM_Driver_2.efi. In addition to the data included in the URP firmware volume 100, the URP capsule 110 shown in FIG. 2 includes a URP capsule manifest header 44, a platform public key 46, and a URP capsule signature (which may be the patch signature 48) appended at the end of the URP firmware volume 100.

An example data structure that may be used for the URP capsule manifest header 44 is provided below:

```
typedef struct __URP_MANIFEST_HEADER
{
    UINT32              MagicNum;       // 'U', 'R', 'P', 'M' signature
    UINT32              Type;           // Reserved for future use
to identify Rollback Capsule
    UINT32              KeyLength;      // Signing key length, 256
bytes by default
    UINT32              PatchVer;       // 32 bit integer for URP
Capsule Version
    BIOS_VERSION_INFO   BaseBiosVersion; // Base BIOS version the
``` patch is built with
```
    //UINT8           PublicKey[KeyLength];
    //UINT8           Signature[KeyLength];
} URP_MANIFEST_HEADER;
```

Alternatively, some other data structure may be used to define the URP capsule manifest header 44.

Returning to FIG. 1, the instructions may further cause the processor 12 to perform a first verification check 70 on the firmware update patch 40 stored in the runtime buffer 30. The processor 12 may perform the first verification check 70 to determine whether the firmware update patch 40 is authorized to make modifications to the firmware 52. In some embodiments, the first verification check 70 may be performed on at least the platform public key 46 included in the firmware update patch 40. Additionally or alternatively, the first verification check 70 may be performed on at least the patch signature 48 of the firmware update patch 40.

In some embodiments, the memory 14 further stores instructions that, when executed, cause the processor 12 to store a firmware patch version indicator 45 in the memory 14. The firmware patch version indicator 45 may identify (e.g. with a version number) a version to which the firmware update patch 40 is configured to update the firmware 52. In embodiments in which the firmware update patch 40 is a URP capsule, the firmware patch version indicator 45 may be included in the URP capsule manifest header 44. Thus, the firmware patch version indicator 45 may be stored in the runtime buffer 30. In embodiments in which a firmware patch version indicator 45 is stored in the memory 14, the first verification check 70 may be further performed on the firmware patch version indicator 45.

In embodiments in which the firmware patch version indicator 45 is checked as part of the first verification check 70, the processor 12 may determine that the firmware update patch 40 passes the first verification check 70 at least in part by determining that a firmware version indicated by the firmware patch version indicator 45 is more recent than a currently installed firmware version 53. Thus, by checking the firmware patch version indicator 45, the processor 12 may be configured to determine whether the firmware update patch 40 is compatible with the currently installed firmware version 53.

The memory 14 of the computing system 10 may further include system management random access memory (SMRAM) 26 configured to be read and written to by the firmware 52 but not the operating system 50. The SMRAM 26 may include an SMRAM buffer 32 into which firmware update instructions are configured to be loaded. The SMRAM buffer 32 may be accessible by the firmware 52 and inaccessible by the operating system 50 of the computing system 10.

In some embodiments, the first verification check 70 may include a determination of an available capacity 34 of the SMRAM buffer 32. The processor 12 may be configured to determine that the firmware update patch 40 passes the first verification check 70 at least in part by determining that the available capacity 34 of the SMRAM buffer 32 is larger than a file size 74 of the firmware update patch 40. Thus, the processor 12 may determine whether firmware update patch 40 fits within the SMRAM buffer 32 in order to prevent the SMRAM buffer 32 from overflowing.

After performing the first verification check 70, when the firmware update patch 40 passes the first verification check 70, the instructions may further cause the processor 12 to copy the firmware update patch 40 to the SMRAM buffer 32. Thus, the processor 12 may be configured to generate a firmware update patch copy 60. The firmware update patch copy 60 may include a firmware volume copy 62, a platform public key copy 66, and a patch signature copy 68. In embodiments in which the firmware update patch copy 60 is a URP capsule, the firmware update patch copy 60 may further include a URP capsule manifest header copy 64, which may, in some embodiments, include a firmware patch version indicator copy 65. The firmware update patch copy 60 may be generated at the firmware 52.

The instructions may further cause the processor 12 to perform a second verification check 72 on the firmware update patch copy 60 stored in the SMRAM buffer 32. When the processor 12 performs the second verification check 72, the processor 12 may be configured to check one or more of the properties checked during the first verification check 70, but for the firmware update patch copy 60 instead of the firmware update patch 40. In some embodiments, the second verification check 72 may be performed on at least the platform public key copy 66. Additionally or alternatively, the second verification check 72 may be performed on at least the patch signature copy 68.

In embodiments in which a firmware patch version indicator copy 65 is included in the firmware update patch copy 60, the second verification check 72 may be performed at least on the firmware patch version indicator copy 65. In such embodiments, the instructions may cause the processor 12 to determine that the firmware update patch copy 60 passes the second verification check 72 at least in part by determining that the firmware version indicated by the firmware patch version indicator copy 65 is more recent than the currently installed firmware version 53.

In some embodiments, performing the second verification check 72 may include determining the available capacity 34 of the SMRAM buffer 32. In such embodiments, the instructions may cause the processor 12 to determine that the firmware update patch copy 60 passes the second verification check 72 at least in part by determining that the available capacity 34 of the SMRAM buffer 32 is larger than the file size of the firmware update patch copy 60.

When the firmware update patch copy 60 passes the second verification check 72, the instructions may further cause the processor 12 to execute the firmware update patch copy 60. When the processor 12 executes the firmware update patch copy 60, code included in the firmware volume copy 62 may modify and/or replace one or more system management mode (SMM) drivers included in the firmware 52, as described in further detail below. In some embodiments, the firmware update patch copy 60 may be executed in a runtime SMM without rebooting the computing system 10. SMM may be the highest level of administrative privileges for the computing system 10.

Figure 3:
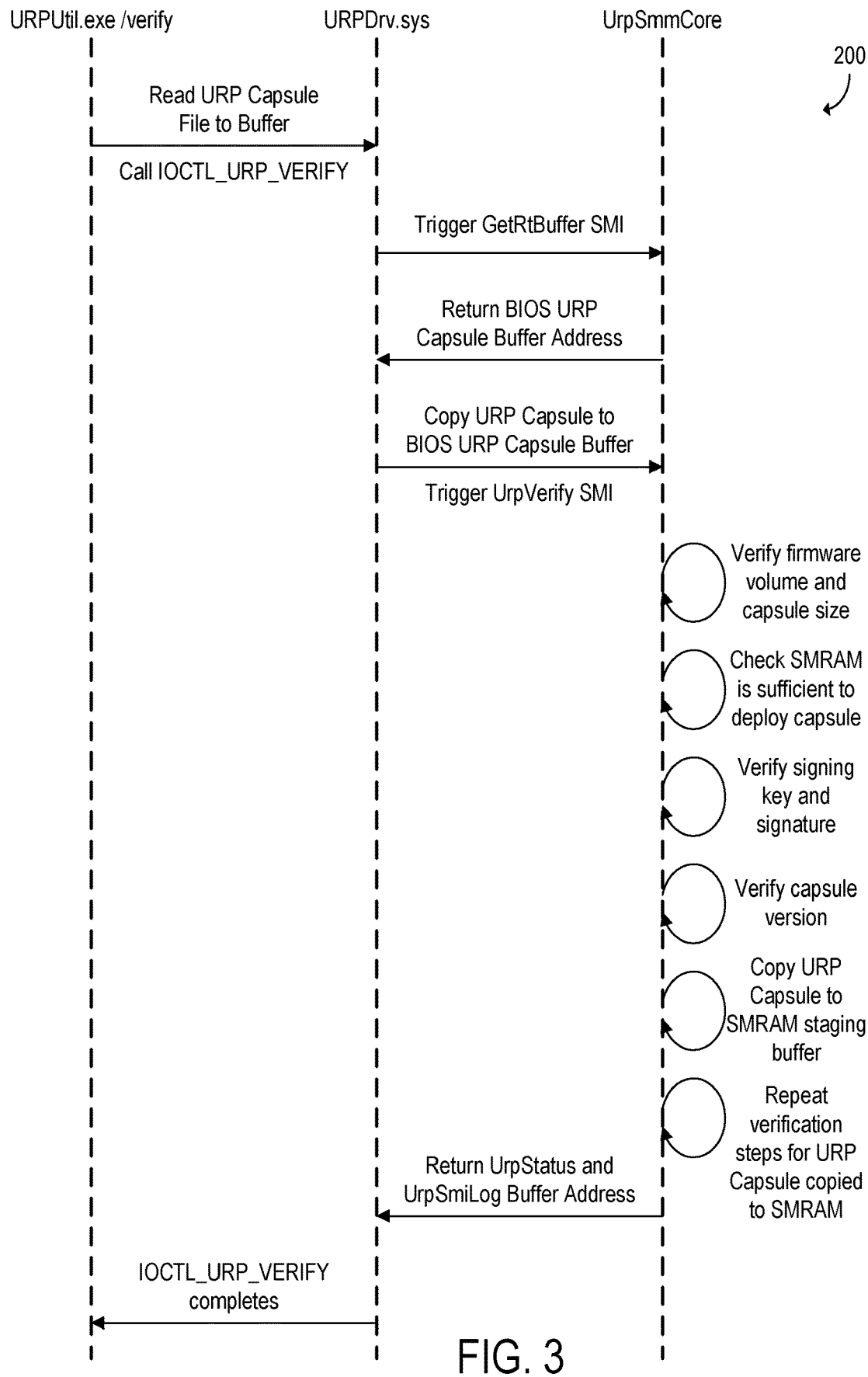
FIG. 3 shows an example verification process that may be performed on the firmware update patch, according to the embodiment of FIG. 1.

FIG. 3 shows an example verification process 200 that may be performed on the firmware update patch 40 at the processor 12, according to the embodiment of FIG. 1. In the example of FIG. 3, the firmware update patch 40 is a URP capsule. The verification process 200 of FIG. 3 may be executed when the processor 12 receives a /verify command at a command line utility URPUtil.exe included in the operating system 50. When the processor 12 receives the /verify command, the processor 12 may be further configured to send an IOCTL_URP_VERIFY request to a URPDrv.sys kernel mode driver, which may be included in the operating system 50. The URPUtil.exe /verify command may include a command to read the URP capsule file to the runtime buffer 30.

At the URPDrv.sys kernel mode driver, the verification process 200 may further include triggering a GetRtBuffer system management interrupt (SMI). The GetRtBuffer SMI may be sent to a UrpSmmCore driver included in the firmware 52. The UrpSmmCore driver may return a BIOS URP capsule buffer address to the URPDrv.sys kernel mode driver in response to the GetRtBuffer SMI. The BIOS URP capsule buffer address may be the location of the runtime buffer 30 in the UEFI runtime memory 24. After receiving the BIOS URP capsule buffer address, the URPDrv.sys kernel mode driver may be further configured to copy the URP capsule to the BIOS URP capsule buffer, which is used in the example of FIG. 3 as the runtime buffer 30 accessible to both the operating system 50 and the firmware 52. The URPDrv.sys kernel mode driver may be further configured to trigger a UrpVerify SMI that is sent to the UrpSmmCore driver.

The UrpSmmCore driver may then be configured to perform the first verification check 70. As shown in the example of FIG. 3, the UrpSmmCore driver may be configured to verify the file size 74 of the firmware volume 42 and URP capsule. The UrpSmmCore driver may be further configured to check whether the available capacity 34 of the SMRAM 26 is sufficient to deploy the URP capsule. The UrpSmmCore driver may be further configured to verify the signing key and the signature of the URP capsule and verify that the capsule version of the URP capsule is more recent than the currently installed firmware version 53.

When the UrpSmmCore driver determines that the URP capsule passes the first verification check 70, the UrpSmmCore may copy the URP capsule to the SMRAM buffer 32. The SMRAM buffer 32 may be used by the UrpSmmCore driver as a staging buffer from which the URP capsule may be installed into the firmware 52. Copying the URP capsule into the SMRAM buffer 32 may be referred to as staging the URP capsule. Subsequently to copying the URP capsule into the SMRAM buffer 32, the UrpSmmCore driver may be further configured to repeat, for the URP capsule that has been copied to the SMRAM buffer 32, some or all of the verification steps that were performed as part of the first verification check 70. Thus, the UrpSmmCore driver may perform a second verification check 72 on the URP capsule. In some embodiments, each property included in the first verification check 70 may be checked when performing the second verification check 72. In other embodiments, one or more steps of the first verification check 70 may be omitted. Additionally or alternatively, one or more additional checks not performed in the first verification check 70 may be added when the second verification check 72 is performed.

After performing the second verification check 72, the UrpSmmCore driver may be further configured to return a status code (shown in FIG. 3 as UrpStatus) and a return message (shown in FIG. 3 as a UrpSmiLog buffer address) to the URPDrv.sys kernel mode driver. The status code may indicate a current status of a corresponding SMI interrupt. For example, the status code may be an indication that the URP capsule passed the first verification check 70 and the second verification check 72 and was successfully copied to the SMRAM buffer 32. As shown in the example of FIG. 3, the UrpSmiLog buffer address indicated in the return message may be a buffer address in the runtime buffer 30 at which the status code is located. The UrpSmiLog buffer address may also store other information related to the firmware update patch 40, such as the firmware patch version indicator 45. The UrpDrv.sys kernel mode driver may be further configured to complete the execution of IOCTL_URP_VERIFY and return to the command line utility URPUtil.exe. The processor 12 may be configured to output, at the command line utility URPUtil.exe, a notification that the URPUtil.exe /verify command has been completed.

Figure 4:
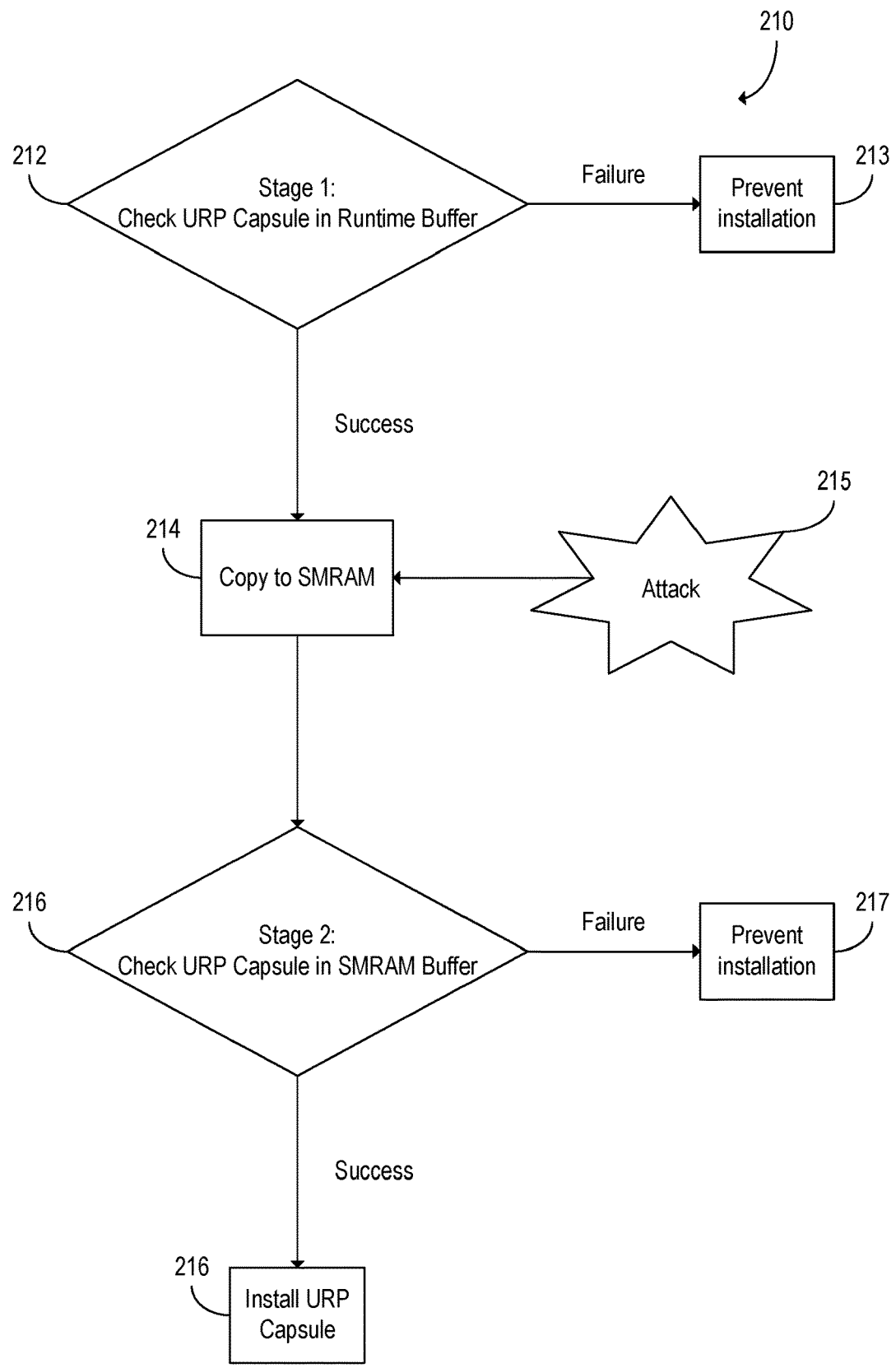
FIG. 4 shows an example flowchart in which a time-of-check-time-of-use (TOC-TOU) attack is prevented, according to the embodiment of FIG. 1.

As shown in the example flowchart 210 of FIG. 4, performing both the first verification check 70 and the second verification check 72 may protect the computing system 10 from the types of attacks described above in which malicious code is inserted when the firmware update patch 40 is copied into the SMRAM buffer 32. In this example, the first verification check 70 on the URP capsule at the runtime buffer 30 is performed at step 212. When the first verification check 70 succeeds, the URP capsule may be copied to the SMRAM at step 214. When the first verification check 70 fails, installation of the URP capsule may be prevented at step 213. If an attack 215 that modifies the URP capsule is performed when the URP capsule is copied to the SMRAM, the modifications to the URP capsule may be detected at step 216 when the second verification check 72 is performed on the copy of the URP capsule in the SMRAM buffer 32. The modifications made during the attack 215 may cause the URP capsule to fail the second verification check 72. When the URP capsule fails the second verification check 72, installation of the URP capsule may be prevented at step 217. Thus, installation of a compromised URP capsule may be avoided. When the URP capsule passes the second verification check 72, installation of the URP capsule may proceed at step 218.

Figure 5:
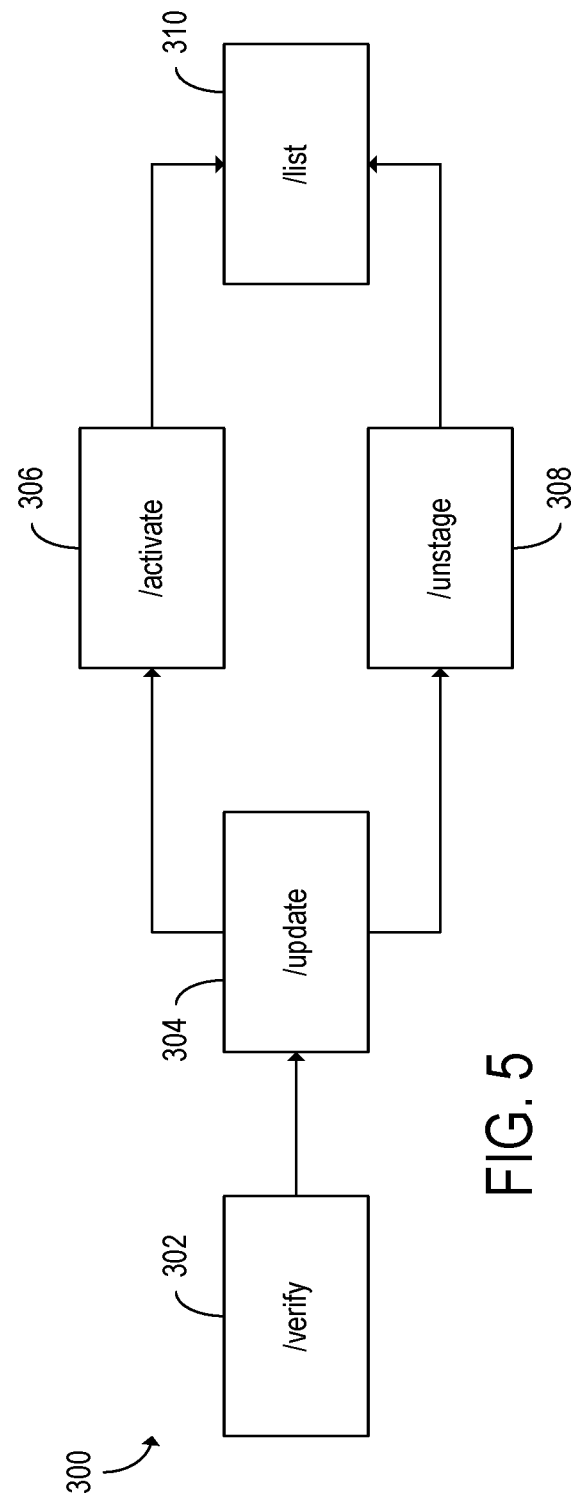
FIG. 5 shows an example flowchart of commands that may be performed at a URPUtil.exe command line utility, according to the embodiment of FIG. 1.

FIG. 5 shows an example flowchart 300 of commands that may be performed at the URPUtil.exe command line utility. At step 302, the processor 12 may be configured to perform the /verify command, as discussed above with reference to FIG. 3. At step 304, the processor 12 may be further configured to perform a /update command, as discussed in further detail below. After the /update command has been performed, the processor 12 may be further configured to perform a /activate command at step 306. The /activate command may cause a staged SMM driver to replace an existing SMM driver included in the firmware 52. Alternatively, a user may enter a /unstage command at step 308. The /unstage command may cancel a staged SMM driver without making changes to any existing SMM drivers. At step 310, the processor 12 may be further configured to perform a /list command. The /list command may output a list of currently staged SMM drivers and/or a list of currently active SMM drivers to the command line utility.

Figure 6:
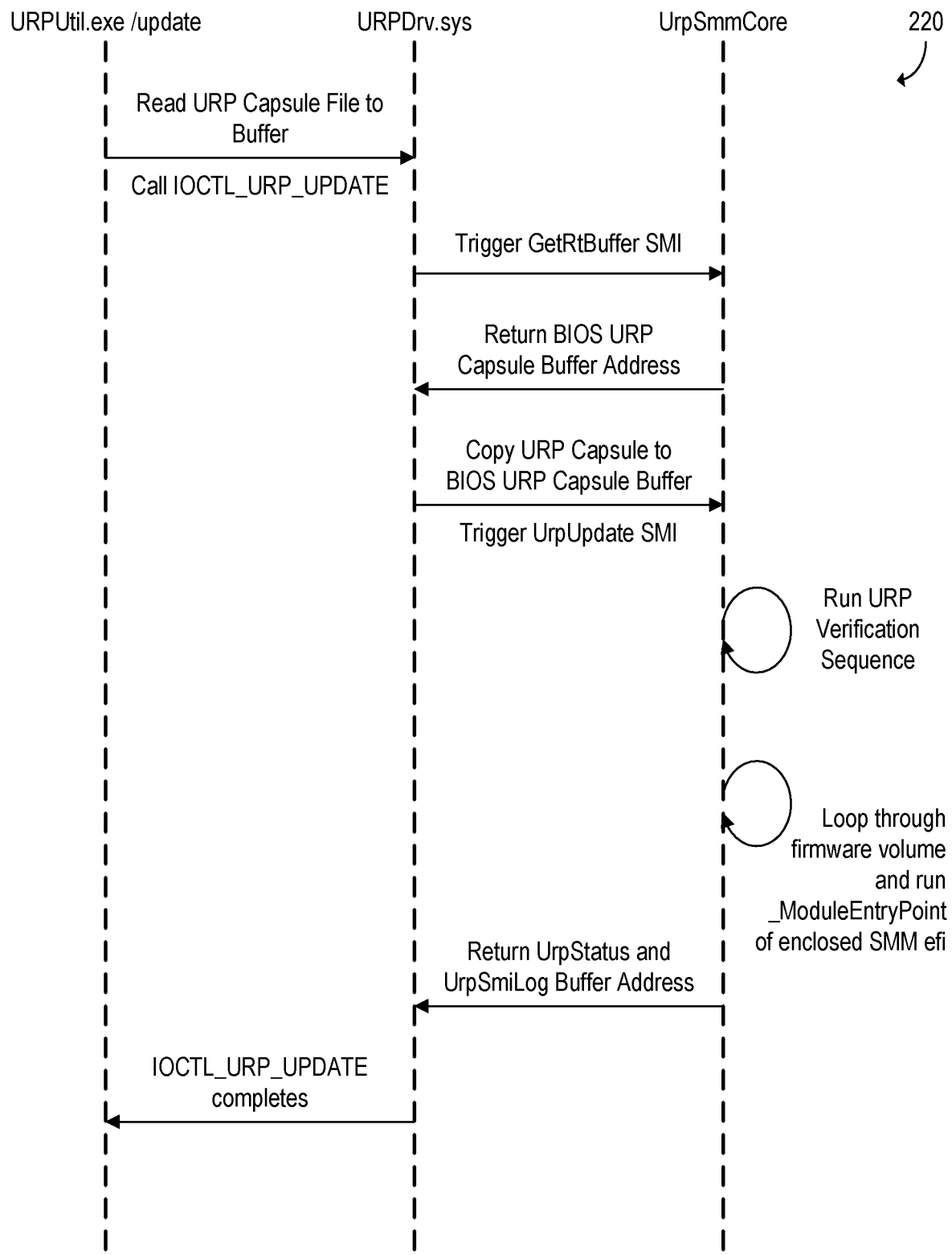
FIG. 6 shows an example updating process that may be performed at the processor, according to the embodiment of FIG. 1.

FIG. 6 shows an example updating process 220 that may be performed at the processor 12. In the example of FIG. 6, the firmware update patch 40 is a URP capsule. The updating process 220 of FIG. 6 may be executed when the processor 12 receives the /update command at the command line utility URPUtil.exe included in the operating system 50. When the processor 12 receives the /update command, the processor 12 may be further configured to send an IOCTL_URP_UPDATE request to the URPDrv.sys kernel mode driver. The IOCTL_URP_UPDATE request may include an instruction to read the URP capsule file to the runtime buffer 30.

At the URPDrv.sys kernel mode driver, the updating process 220 may further include triggering a GetRtBuffer SMI. The GetRtBuffer SMI may be sent to a UrpSmmCore driver included in the firmware 52. The UrpSmmCore driver may return a BIOS URP capsule buffer address to the URPDrv.sys kernel mode driver in response to the GetRtBuffer SMI. The BIOS URP capsule buffer address may be the location of the runtime buffer 30 in the UEFI runtime memory 24. After receiving the BIOS URP capsule buffer address, the URPDrv.sys kernel mode driver may be further configured to copy the URP capsule to the BIOS URP capsule buffer. The URPDrv.sys kernel mode driver may be further configured to trigger a UrpUpdate SMI that is sent to the UrpSmmCore driver.

At the UrpSmmCore driver, the processor 12 may be further configured to run a URP verification sequence including one or more of the checks included in the first verification check 70 and the second verification check 72. In some embodiments, each property included in the first verification check 70 and the second verification check 72 may be checked when performing the updating process 220. In other embodiments, one or more steps of the first verification check 70 or the second verification check 72 may be omitted. Additionally or alternatively, one or more additional checks not performed in the first verification check 70 or the second verification check 72 may be added. Subsequently to running the verification sequence, the UrpSmmCore driver may be further configured to loop through the firmware volume 42 and run a _ModuleEntryPoint method of the enclosed SMM .efi files of the firmware volume 42. The _ModuleEntryPoint method may initialize an EFI_STAGED_DRIVER_ENTRY with a staging globally unique identifier (GUID), as described in further detail below. The _ModuleEntryPoint method may be further configured to pass the staging GUID to a StageUrpDriver method of the UrpSmmCore driver.

After running the _ModuleEntryPoint method, the UrpSmmCore driver may be further configured to return a status code (shown in FIG. 6 as UrpStatus) and a return message (shown in FIG. 6 as the UrpSmiLog buffer address) to the URPDrv.sys kernel mode driver. The UrpStatus may be an indication that the update was performed. The UrpSmiLog buffer address may be a buffer address in the runtime buffer 30 that stores information including the firmware patch version indicator 45 of the newly installed URP capsule, the version indicator of the previously installed version of the SMM driver, or other version control information. The UrpDrv.sys kernel mode driver may be further configured to complete the execution of IOCTL_URP_UPDATE and return to the command line utility URPUtil.exe. The processor 12 may be further configured to output, at the command line utility, a notification that the URPUtil.exe /update command has been completed.

Figure 7:
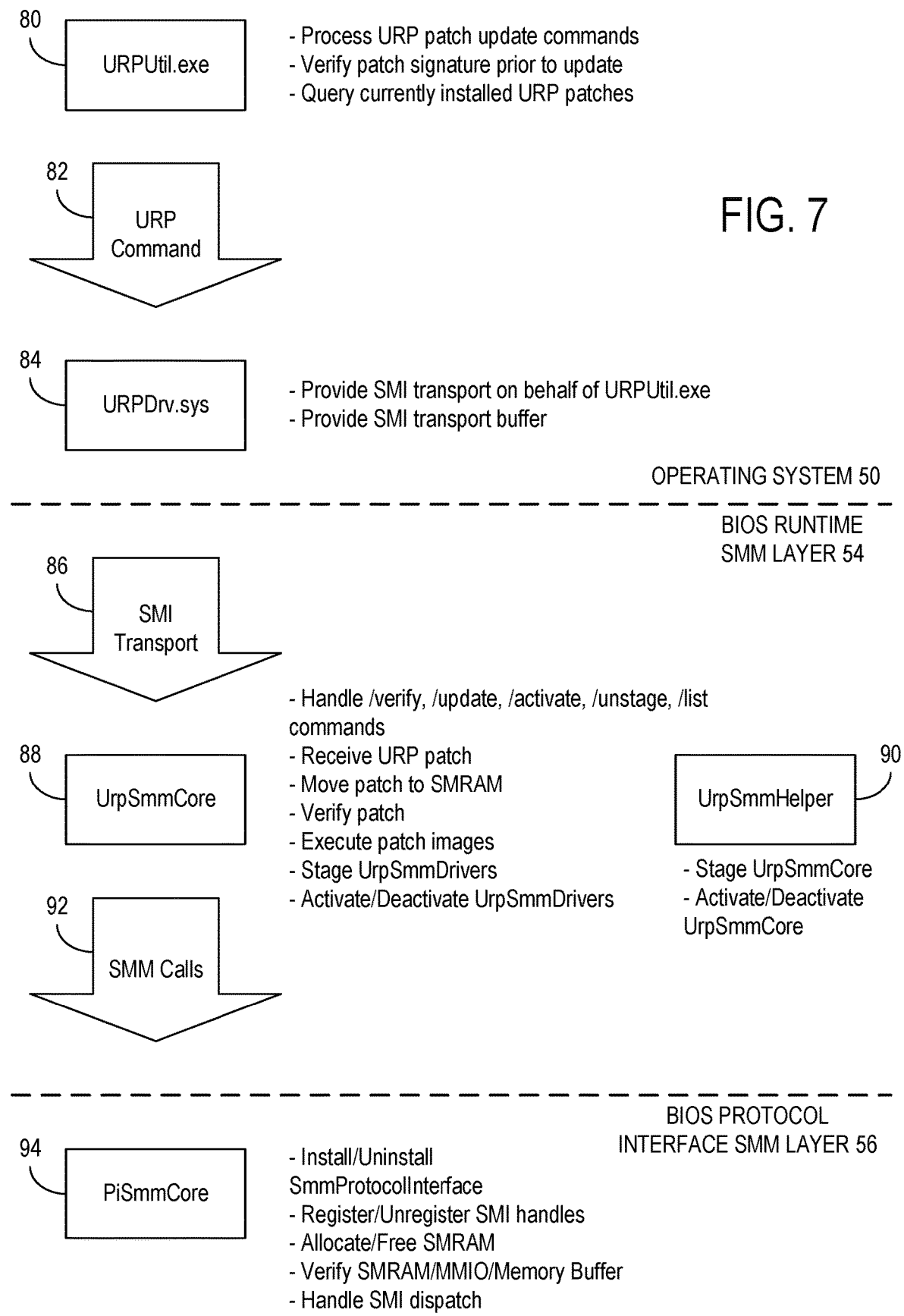
FIG. 7 shows an operating system, a BIOS runtime system management mode (SMM) layer, and a BIOS protocol interface SMM layer, according to the embodiment of FIG. 1.

FIG. 7 shows the layers of the operating system 50 and firmware 52 executed by the processor 12 in additional detail, according to one example embodiment. In the example of FIG. 7, the firmware 52 includes a BIOS runtime SMM layer 54 and a BIOS protocol interface SMM layer 56. As discussed above, the operating system 80 may include a URPUtil.exe command line utility 80. At the URPUtil.exe command line utility 80, the processor 12 may be configured to process URP patch update commands, verify patch signatures 48 of firmware update patches 40, and/or query currently installed URP patches. The URPUtil.exe command line utility 80 may be further configured to convey a URP command 82 to the URPDrv.sys kernel mode driver 84. For example, the URP command 82 may be one of the commands shown in FIG. 5. The URPDrv.sys kernel mode driver 84 may be configured to provide SMI transport to the firmware 52 on behalf of the URPUtil.exe command line utility 80. The URPDrv.sys kernel mode driver 84 may be further configured to provide an SMI transport buffer to the BIOS runtime SMM layer 54.

At the BIOS runtime SMM layer 54, the processor 12 may be further configured to perform an SMI transport 86 to the UrpSmmCore driver 88. The UrpSmmCore driver 88 may be configured to handle /verify, /update, /activate, /unstage, and /list commands received from the URPDrv.sys kernel mode driver 84. The UrpSmmCore driver 88 may be further configured to receive the URP capsule from the operating system 50 and copy the URP capsule to the SMRAM 26. In addition, the UrpSmmCore driver 88 may be further configured to perform the first verification check 70 and the second verification check 72 on the URP capsule and execute the patch images included in the firmware volume copy 62. The UrpSmmCore driver 88 may be further configured to stage, activate, and deactivate UrpSmmDrivers such as the example SMM driver 400 discussed below with reference to FIG. 8.

At the BIOS protocol interface SMM layer 56, the processor 12 may be further configured to execute a PiSmmCore driver 94. The PiSmmCore driver 94 may be configured to receive one or more SMM calls 92 from the UrpSmmCore driver 88. The PiSmmCore driver 94 may be further configured to install or uninstall SmmProtocolInterface, as discussed below. In addition, the PiSmmCore driver 94 may be further configured to register and unregister SMI handles; allocate and free locations in the SMRAM 26; verify SMRAM 26, memory-mapped input/output (MMIO), and memory buffers; and handle SMI dispatching.

Figure 8:
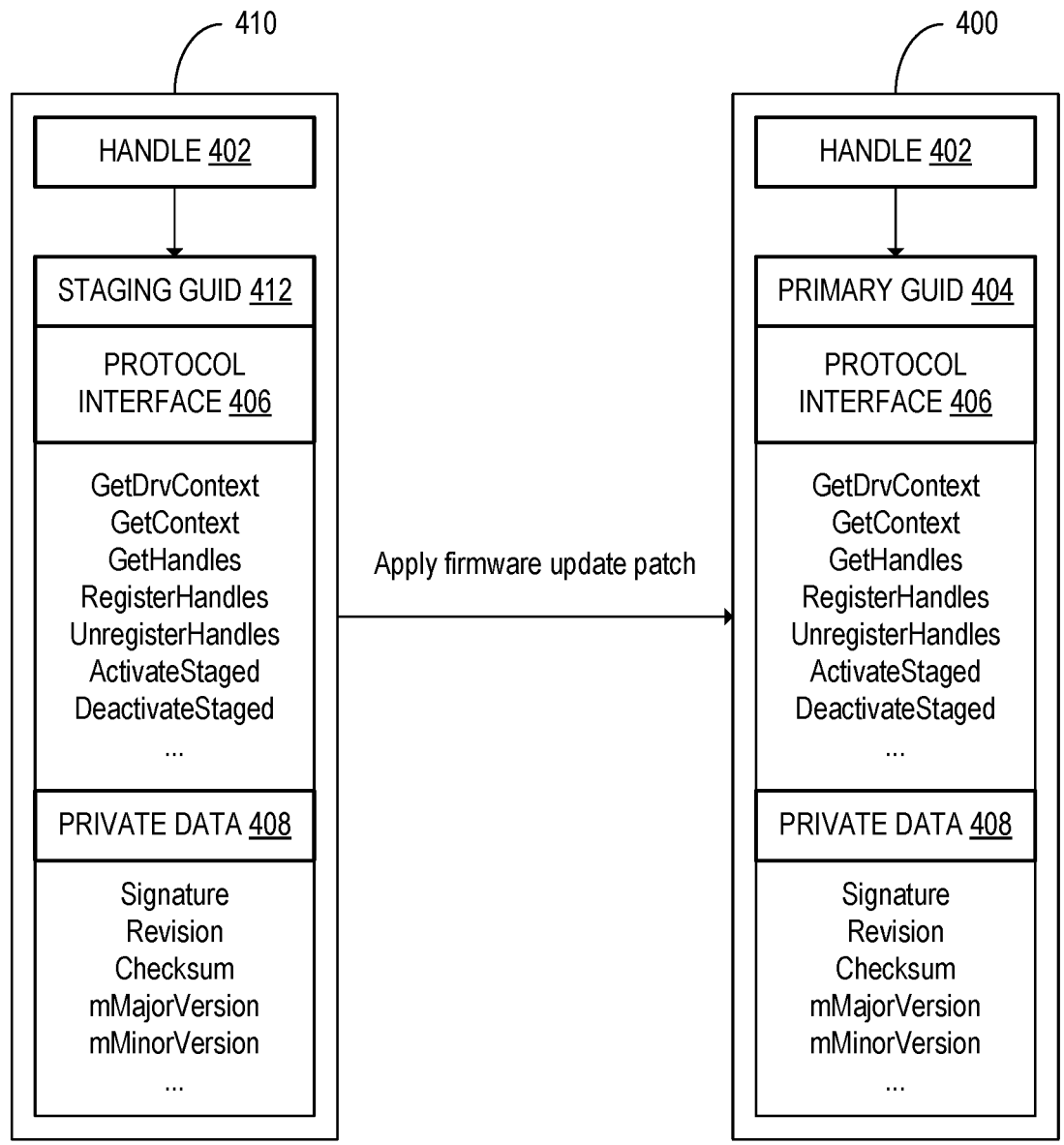
FIG. 8 shows an example SMM driver, according to the embodiment of FIG. 1.

The firmware update patch 40 may be an update to one or more SMM drivers. An example SMM driver 400 is depicted in FIG. 8 as shown when loaded in the SMRAM 26. A handle 402 stored in the SMRAM 402 may indicate the location in the SMRAM 26 at which the image of the SMM driver 400 is stored. In addition, the SMM driver 400 may have a primary GUID 404 that indicates a location of a protocol interface 406 in the SMRAM 26. The protocol interface 406 may include one or more function pointers that respectively point to one or more methods such as GetDrvContext, GetContext, GetHandles, RegisterHandles, UnregisterHandles, ActivateStaged, and DeactivateStaged. Other methods may additionally or alternatively be included in the protocol interface 406. The SMM driver 400 may further include private data 408, such as Signature, Revision, Checksum, mMajorVersion, and mMinorVersion. Other private data 408 may additionally or alternatively be included in the SMM driver 400.

When processor 12 performs the UrpUpdate SMI as shown in FIG. 6, the processor 12 may be configured to load the SMM driver 400 to the SMRAM 26 under the staging GUID 412 of the SMM driver 400 when executing _ModuleEntryPoint. When the processor 12 performs a UrpActivate SMI, as discussed in further detail below, the processor 12 may be configured to replace the driver interface installed under the primary GUID 404 with the driver interface installed under the staging GUID 412.

In some embodiments, as shown in FIGS. 3, 6, and 7, the first verification check 70, the copying of the firmware update patch 40 to the SMRAM buffer 32, and the second verification check 72 may be performed at an SMM core. The SMM core may, for example, be the UrpSmmCore driver 88 or the PiSmmCore driver 94. In addition, the SMM driver 400 is an SMM core in the example of FIG. 8. The memory 14 may further store instructions that, when executed, cause the processor 12 to execute an SMM helper 90 configured to apply the firmware update patch copy 60 to the SMM core to obtain an updated SMM core 410. As shown in the example of FIG. 7, the SMM helper 90 that is configured to apply the firmware update patch copy 60 to the SMM core may be executed in the BIOS runtime SMM layer 54. The SMM helper 90 may be further configured to stage, activate, or deactivate the UrpSmmCore driver 88.

When the firmware update patch copy 60 is used to update the SMM core, the SMM helper 90 may be configured to assign a staging GUID 412 to the firmware update patch copy 60 stored in the SMRAM buffer 32. When the staging GUID 412 is assigned to the firmware update patch copy 60, the SMM helper 90 may be further configured to add the staging GUID 412 to a staged driver list included in the UrpSmmCore driver 88. Subsequently to applying the firmware update patch copy 60 to the SMM core, the SMM helper 90 may reassign the primary GUID 404 to the updated SMM core 410. The SMM helper 90 may be further configured to delete the staging GUID 412 from the staged driver list of the UrpSmmCore driver 88. Thus, processes that identify the SMM core by its primary GUID 404 may treat the updated SMM core 410 as though it were the previous version of the SMM core.

Figure 9:
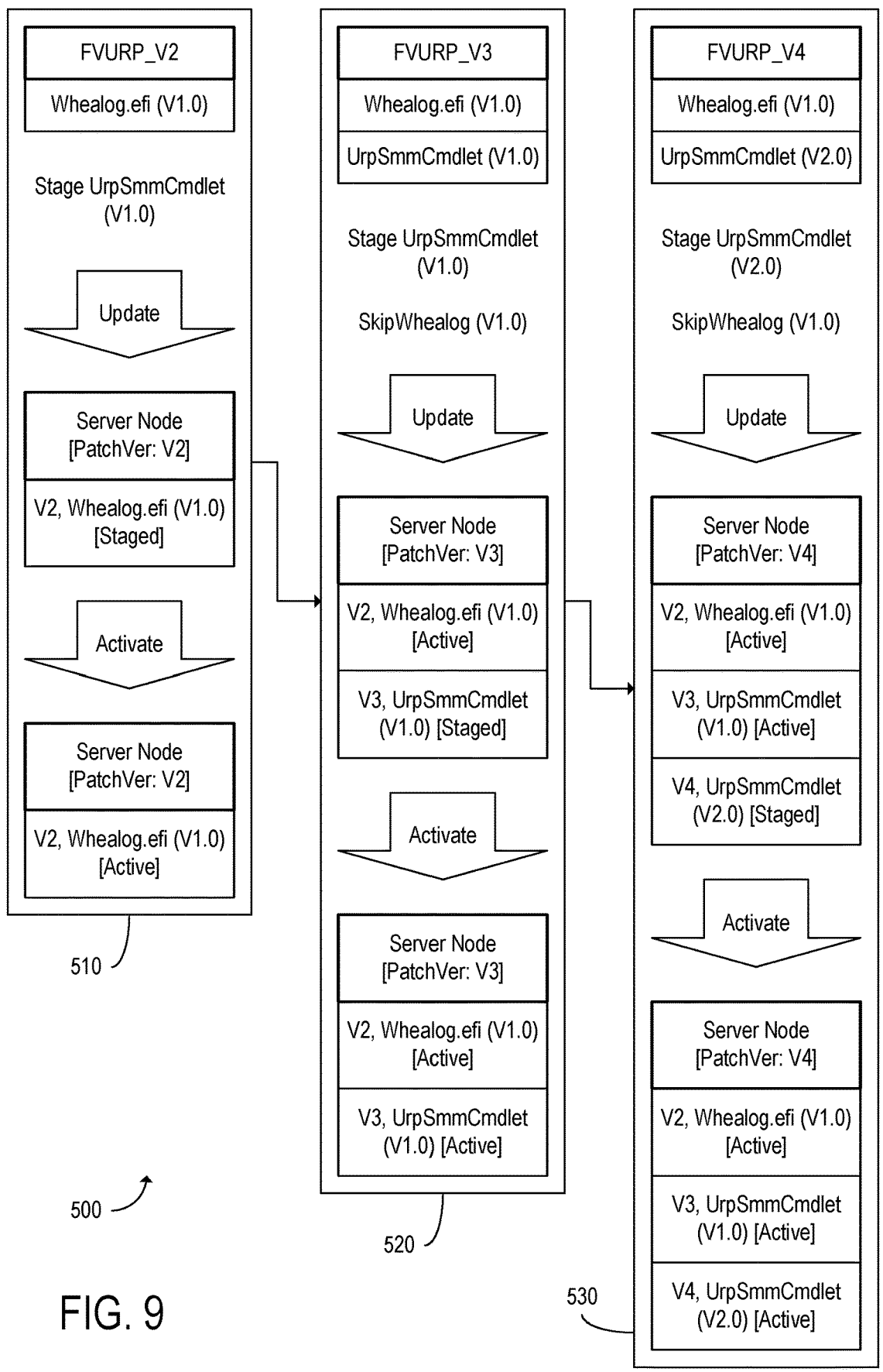
FIG. 9 shows an example version-aware updating sequence, according to the embodiment of FIG. 1.

Turning now to FIG. 9, an example version-aware updating sequence 500 is shown. In the example of FIG. 9, a BIOS update enabling hardware error logging is transmitted to a cluster including a plurality of server computing devices located in a data center. The BIOS update in the example of FIG. 9 includes a URP capsule FVURP_V2.CAP with a firmware volume that includes a whealog.efi SMM driver. The first updating phase 510 of the example version-aware updating sequence 500 includes steps of staging and activating the whealog.efi SMM driver. In the first updating phase 510, the UrpSmmCore driver 88 may be configured to execute the _ModuleEntryPoint method for the whealog.efi SMM driver in order to perform this update. When the first updating phase 510 is performed, the UrpSmmCore driver 88 is further configured to update the server node patch version to V2.

Subsequently to the first updating phase 510, the cluster of server computing devices further receives a UrpSmmCmdlet.efi SMM driver that is configured to add a HelloWorld SMM handler for use by an internal team. Instead of creating a new firmware volume for the newly received URP capsule with the UrpSmmCmdlet.efi SMM driver, which would increase the complexity of the BIOS code repository, the UrpSmmCmdlet.efi SMM driver may be packaged into the same firmware volume as the whealog.efi SMM driver. A second updating phase 520 in which the UrpSmmCmdlet.efi SMM driver is staged and activated is also shown in FIG. 9. In the second updating phase 520, the processor 12 is configured to generate a URP capsule FVURP_V3.CAP including the whealog.efi SMM driver and the UrpSmmCmdlet.efi SMM driver. The UrpSmmCore driver 88 may be further configured to execute the respective _ModuleEntryPoint methods for both the whealog.efi SMM driver and the UrpSmmCmdlet.efi SMM driver.

In order to avoid unnecessarily repeating the staging and activation of the whealog.efi SMM driver, the UrpSmmCore driver 88 may be configured to check whether the version number of the whealog.efi SMM driver in the firmware volume is newer than the version number of the already-installed whealog.efi SMM driver. Since the whealog.efi SMM driver included in the URP capsule FVURP_V3.CAP has the same version number as the whealog.efi SMM driver that is already installed, the UrpSmmCore driver 88 does not stage the whealog.efi SMM driver. In addition, the _ModuleEntryPoint method for the whealog.efi SMM driver may return an error notification and release memory allocated for staging whealog.efi SMM driver. When the second updating phase 520 is performed, the UrpSmmCore driver 88 is further configured to update the server node patch version to V3.

In a third updating phase 530 of the example version-aware updating sequence 500, an update to the UrpSmmCmdlet.efi SMM driver is performed. In the third updating phase 530, the updated version of the UrpSmmCmdlet.efi SMM driver is included in the URP capsule along with the whealog.efi SMM driver and the previous version of the UrpSmmCmdlet.efi SMM driver. The UrpSmmCore driver 88 may be configured to execute the respective _ModuleEntryPoint method for each .efi module included in the URP capsule. As in the second updating phase 520, the whealog.efi SMM driver fails to stage while the UrpSmmCmdlet.efi SMM driver stages successfully. After the UrpSmmCmdlet.efi SMM driver is activated, the server node patch version is updated to V4.

Figure 10A:
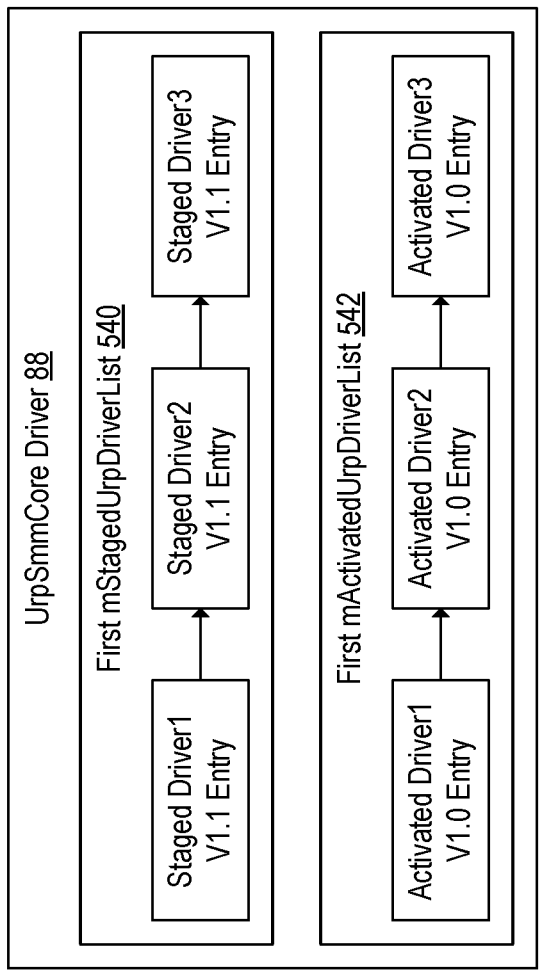
FIG. 10A shows an example UrpSmmCore driver, according to the embodiment of FIG. 1.
Figure 10B:
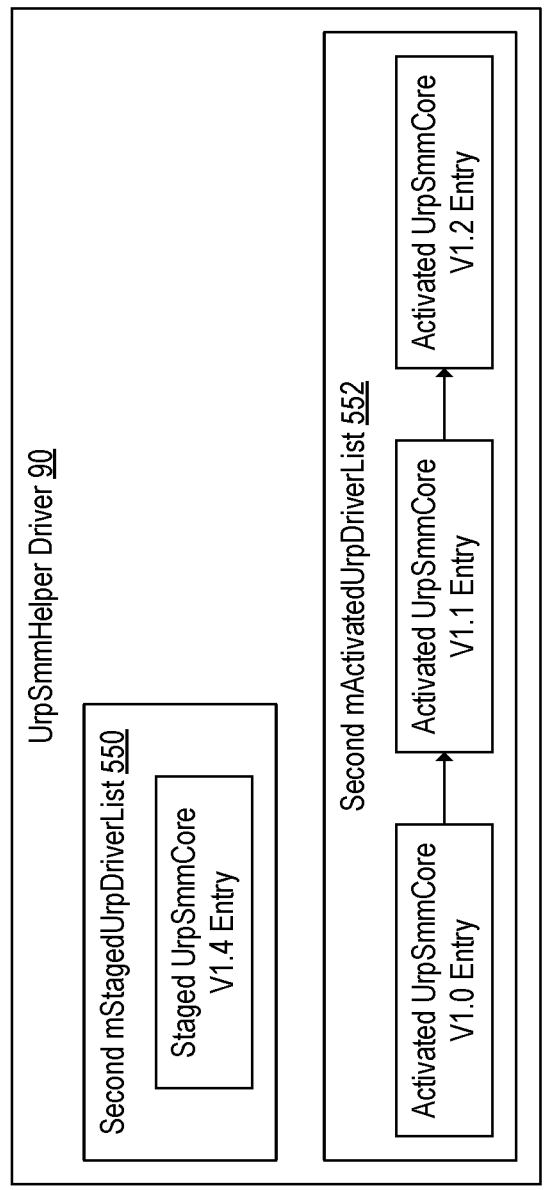
FIG. 10B shows an example UrpSmmHelper driver, according to the embodiment of FIG. 1.

FIGS. 10A-10B respectively show examples of the UrpSmmCore driver 88 and the UrpSmmHelper driver 90 including their respective driver entry lists. The UrpSmmCore driver 88 includes a first mStagedUrpDriverList 540 that indicates each SMM driver currently staged at the UrpSmmCore driver 88 and the respective version number of each staged SMM driver. In the example of FIG. 10A, the first mStagedUrpDriverList 540 includes three staged SMM drivers that each have the version number 1.1. Each of the staged SMM drivers listed in the first mStagedUrpDriverList 540 may be an EFI_STAGED_URP_DRIVER_ENTRY that was added to the first mStagedUrpDriverList 540 by the _ModuleEntryPoint method.

The UrpSmmCore driver 88 may further include a first mActivatedUrpDriverList 542 that indicates each currently activated SMM driver at the UrpSmmCore driver 88 and the respective version numbers of those SMM drivers. In the example of FIG. 10A, the first mActivatedUrpDriverList 542 includes three activated SMM drivers that each have the version number 1.0.

FIG. 10B shows a second mStagedUrpDriverList 550 included in the UrpSmmHelper driver 90. The second mStagedUrpDriverList 550 indicates the UrpSmmCore driver currently staged at the UrpSmmHelper driver 90 and the respective version number of the UrpSmmCore driver. In the example of FIG. 10B, the second mStagedUrpDriverList 550 indicates one UrpSmmCore driver 88 with the version number 1.4. The UrpSmmHelper driver 90 may further include a second mActivatedUrpDriverList 552 that indicates each currently activated UrpSmmCore driver 88 at the UrpSmmHelper core 90, as well as the respective version number of each previously activated UrpSmmCore driver 88. In the example of FIG. 10B, the second mActivatedUrpDriverList 552 indicates three previously activated UrpSmmCore drivers 88 that have respective version numbers of 1.0, 1.1, and 1.2.

Figure 11:
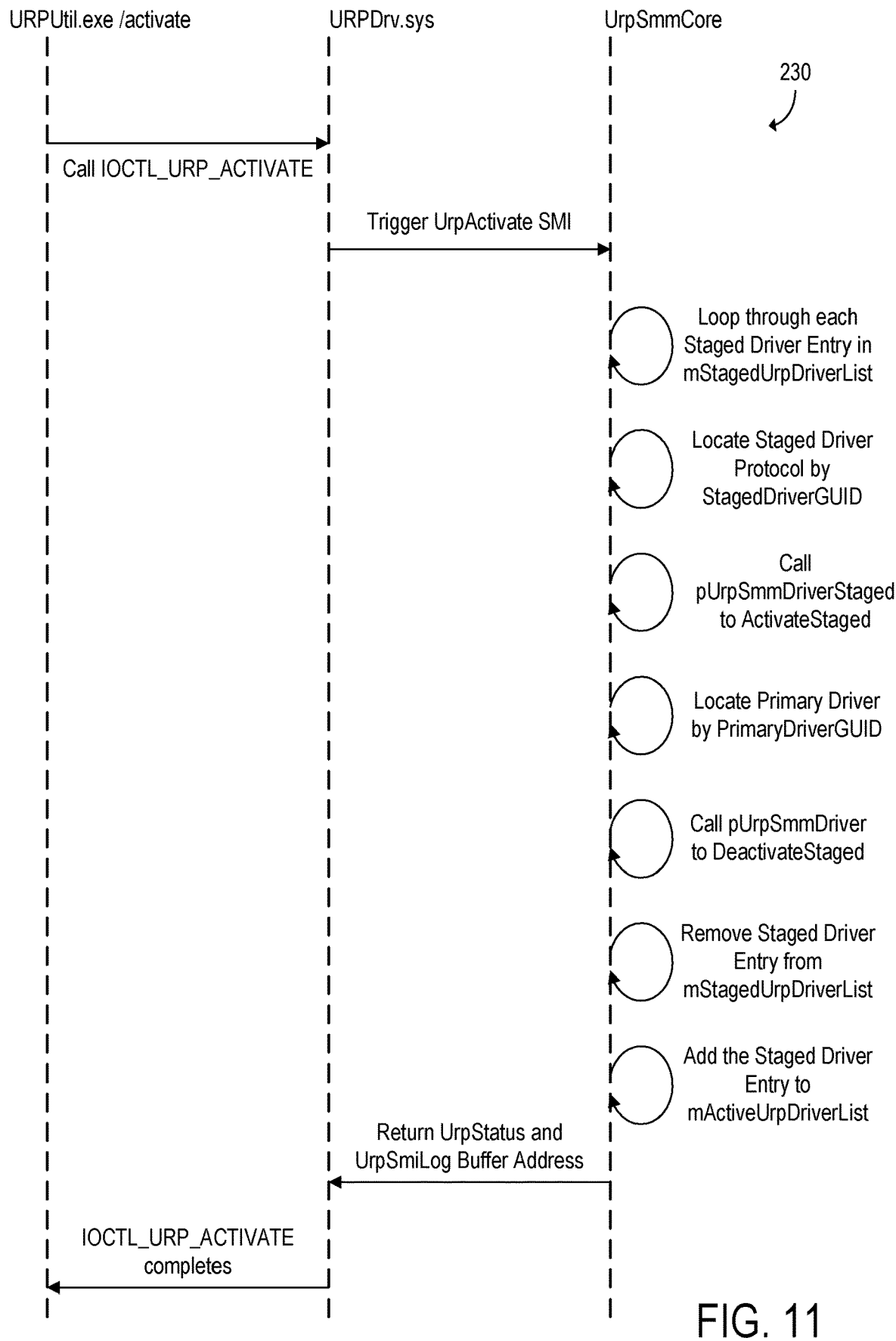
FIG. 11 shows an example activation process that may be performed at the processor, according to the embodiment of FIG. 1.

FIG. 11 shows an example activation process 230 that may be performed on the firmware update patch 40 at the processor 12. In the example of FIG. 11, the firmware update patch 40 is a URP capsule. The activation process 230 of FIG. 11 may be executed when the processor 12 receives the /activate command at the command line utility URPUtil.exe included in the operating system 50. When the /activate command is received, the processor 12 may be further configured to send an IOCTL_URP_ACTIVATE request to the URPDrv.sys kernel mode driver. At the URPDrv.sys kernel mode driver, the activation process 230 may further include triggering a UrpActivate SMI, which may be sent to the UrpSmmCore driver 88.

At the UrpSmmCore driver 88, in response to receiving the UrpActivate SMI, the processor 12 may be further configured to loop through each staged driver entry in the first mStagedUrpDriverList 540. For each staged driver entry, the processor 12 may be configured to locate a staged driver protocol for that staged driver entry based on the StagedDriverGUID of that staged driver entry. The StagedDriverGUID may be a staging GUID 412 for that staged driver entry.

The processor 12 may be further configured to call an ActivateStaged method of the staged driver entry that is pointed to by a pUrpSmmDriverStaged pointer. The ActivateStaged method may retrieve contextual data of a primary driver 400 and migrate that contextual data to the staged driver. The primary driver may be an SMM driver 400 that is already installed in the firmware 52. Retrieving the contextual data may include locating the primary driver based on its PrimaryDriverGUID, which may be the primary GUID 404 included in the SMM driver 400 shown in FIG. 8. The ActivateStaged method may then uninstall the protocol interface 406 of the primary driver and generate a new primary driver protocol interface 406 with the contextual data. The processor 12 may be further configured to call a DeactivateStaged method pointed to by a pUrpSmmDriver pointer. The DeactivateStaged method may deactivate the staged driver.

The processor 12 may be further configured to remove the staged driver entry from the first mStagedUrpDriverList 540 and add the staged driver entry to the first mActiveUrpDriverList 542. The processor 12 may be further configured to return the UrpStatus and UrpSmiLog buffer address of the URP capsule to the URPDrv.sys kernel mode driver. The processor 12 may be further configured to complete the execution of IOCTL_URP_ACTIVATE and return to the URPUtil.exe command line utility.

Figure 12A:
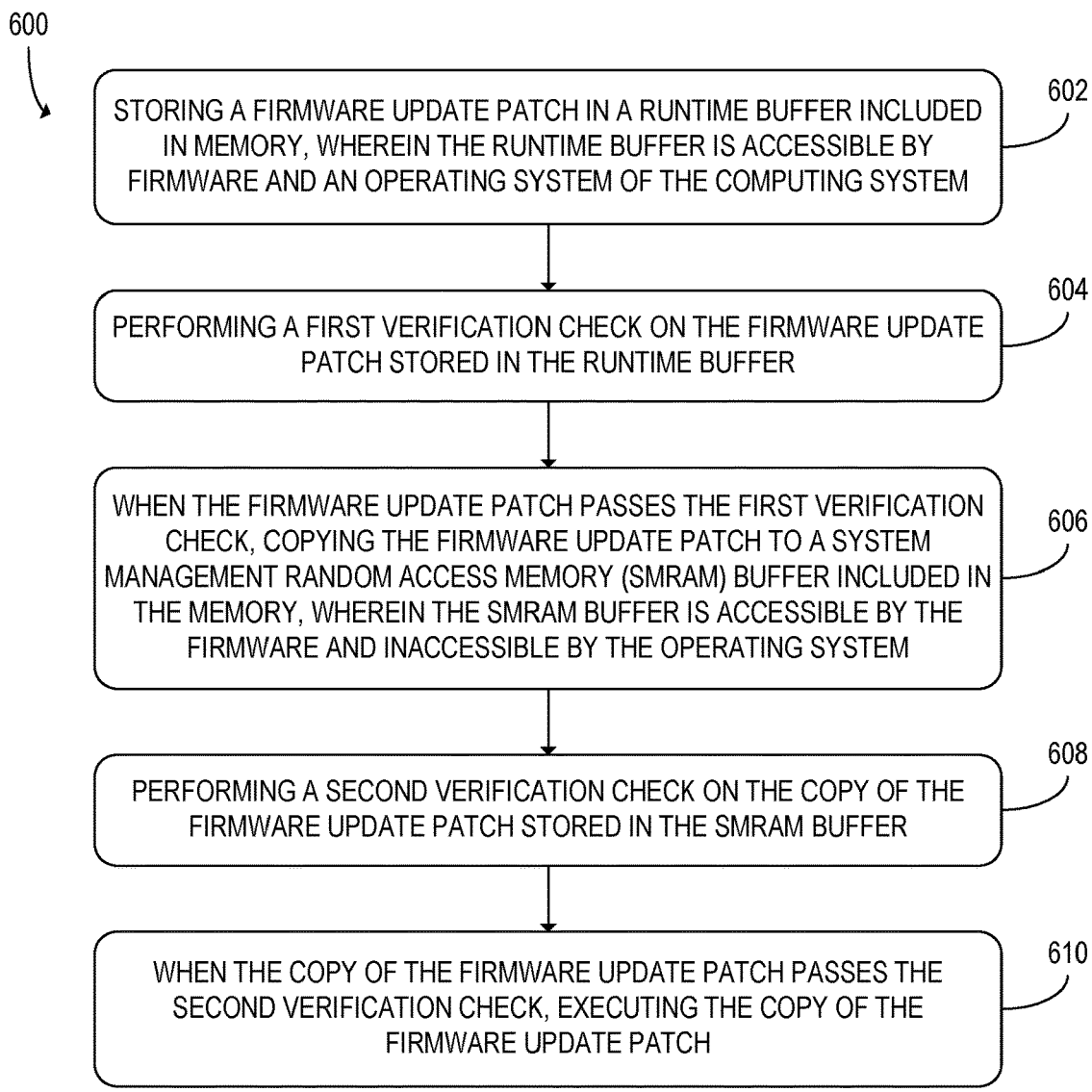
FIG. 12A shows a flowchart of a method for use with a computing system, according to the embodiment of FIG. 1.

Turning now to FIG. 12A, a flowchart of a method 600 for use with a computing system is depicted. The method 600 may be used with the computing system 10 of FIG. 1 or with some other computing device. At step 602, the method 600 may include storing a firmware update patch in a runtime buffer included in memory. The runtime buffer may be included in RAM and may be accessible by firmware and an operating system of the computing system. In some embodiments, the firmware update patch may be a URP capsule including a firmware volume, a URP capsule manifest header, a platform public key, and a patch signature.

At step 604, the method 600 may further include performing a first verification check on the firmware update patch stored in the runtime buffer. In embodiments in which the firmware update patch is a URP capsule, the first verification check may be performed on at least the platform public key. Additionally or alternatively, the first verification check may be performed on at least the patch signature. When the firmware update patch passes the first verification check, the method 600 may further include, at step 606, copying the firmware update patch to an SMRAM buffer included in the memory. The SMRAM buffer may be accessible by the firmware and inaccessible by the operating system.

At step 608, the method 600 may further include performing a second verification check on the copy of the firmware update patch stored in the SMRAM buffer. The second verification check may be performed to check whether the firmware update patch has been modified (e.g. in a TOC-TOU attack) following the first verification check. In embodiments in which the firmware update patch is a URP capsule, the second verification check may be performed on at least a copy of the platform public key included in the copy of the firmware update patch. Alternatively, the second verification check may be performed on at least a copy of the patch signature included in the copy of the firmware update patch. When the copy of the firmware update patch passes the second verification check, the method 600 may further include, at step 610, executing the copy of the firmware update patch.

Figure 12B:
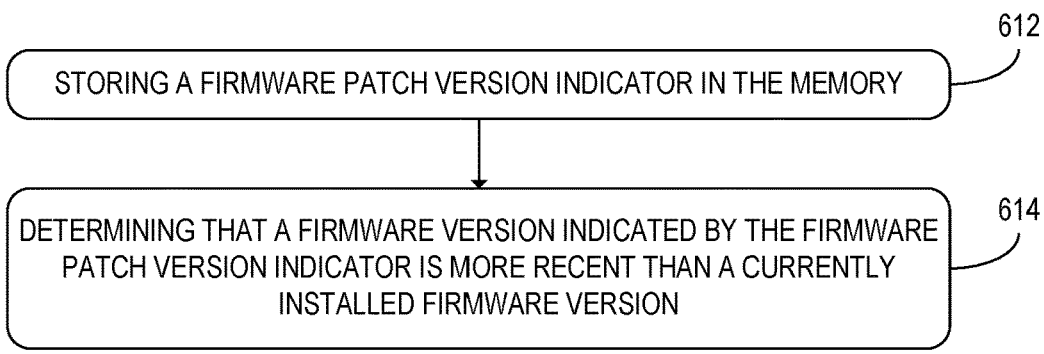
FIGS. 12B-12E show additional steps of the method of FIG. 12A that may be performed in some embodiments.

FIG. 12B shows additional steps of the method 600 that may be performed in some embodiments. At step 612, the method 600 may further include storing a firmware patch version indicator in the memory. In embodiments in which the firmware update patch is a URP capsule, the firmware patch version may be included in the URP capsule manifest header. In some embodiments, the first verification check or the second verification check may be performed at least on the firmware patch version indicator. In embodiments in which the firmware update patch version indicator is checked during the first verification check, the firmware update patch version indicator may be stored in the runtime buffer. In embodiments in which the firmware update patch version indicator is checked during the second verification check, a firmware patch version indicator copy may be stored in the SMRAM buffer. Determining that the firmware update patch passes the first verification check or the second verification check may include, at step 614, determining that a firmware version indicated by the firmware patch version indicator is more recent than a currently installed firmware version. Thus, when the firmware update patch includes modifications to the firmware that have already been made in addition to new modifications included in the same firmware volume, repetition of updates may be avoided.

Figure 12C:
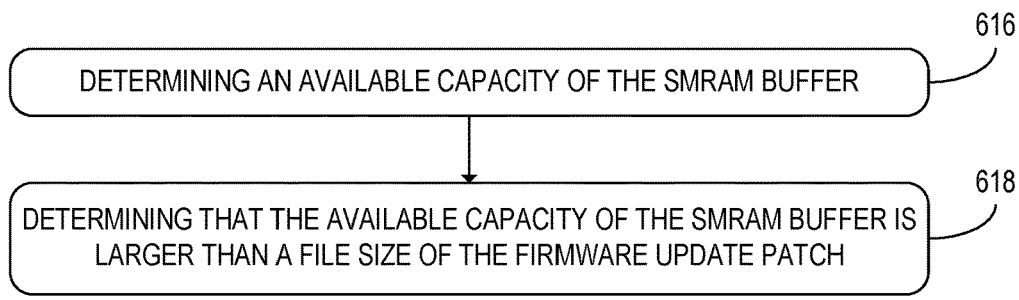

FIG. 12C also shows additional steps of the method 600 that may be performed in some embodiments. At step 616, the method 600 may further include determining an available capacity of the SMRAM buffer. In embodiments in which step 616 is performed, the method 600 may further include, at step 618, determining that the available capacity of the SMRAM buffer is larger than a file size of the firmware update patch. Step 618 may be performed as part of the first verification check or the second verification check.

Figure 12D:
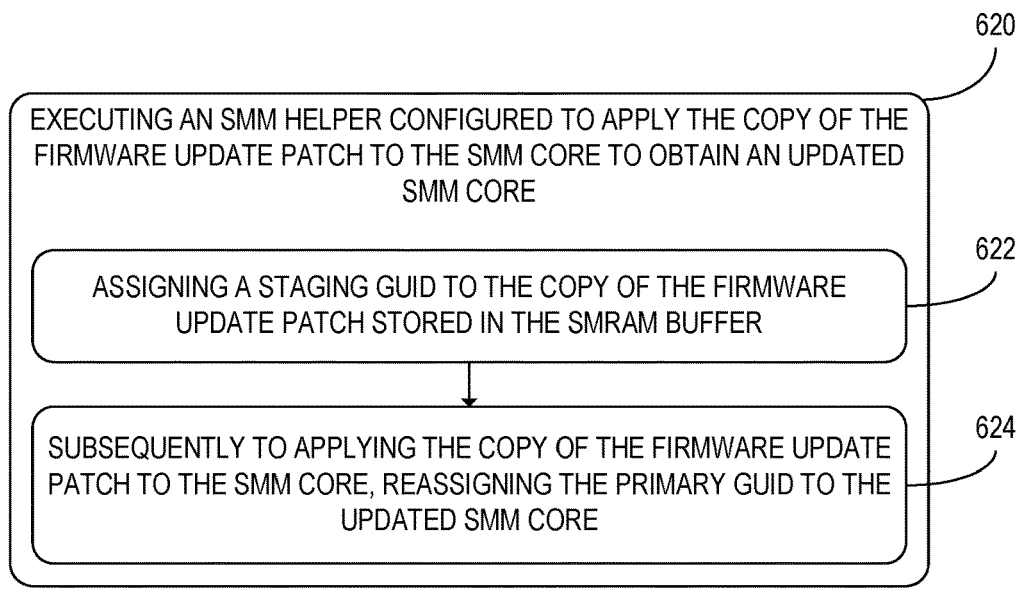

FIG. 12D also shows additional steps of the method 600 that may be performed in some embodiments. The steps shown in FIG. 12D may be performed in embodiments in which the firmware update patch is an update to an SMM driver having a primary globally unique identifier (GUID). In such embodiments, the first verification check, the copying of the firmware update patch to the SMRAM buffer, and the second verification check as shown in steps 604, 606, and 608 may be performed at an SMM core. At step 620, the method 600 may further include executing an SMM helper configured to apply the copy of the firmware update patch to the SMM core to obtain an updated SMM core. Step 620 may include, at step 622, assigning a staging GUID to the copy of the firmware update patch stored in the SMRAM buffer. Step 620 may further include, at step 624, reassigning the primary GUID to the updated SMM core subsequently to applying the copy of the firmware update patch to the SMM core. Thus, the staging GUID may be used as a temporary GUID during updating, and the primary GUID may replace the staging GUID after the SMM core is updated.

Figure 12E:
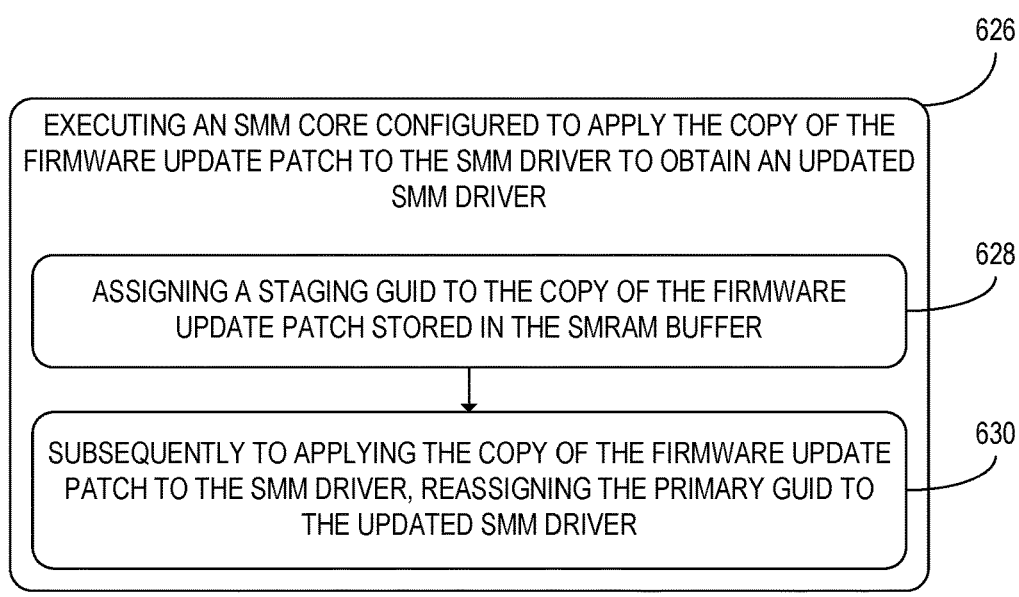

Additional steps similar to those of FIG. 12D may be performed as part of the method 600 when an SMM driver other than an SMM core is updated, as shown in FIG. 12E. At step 626, the method 600 may further include executing an SMM core configured to apply the copy of the firmware update patch to the SMM driver to obtain an updated SMM driver. Step 626 may include, at step 628, assigning a staging GUID to the copy of the firmware update patch stored in the SMRAM buffer. Step 626 may further include, at step 630, reassigning the primary GUID to the updated SMM driver subsequently to applying the copy of the firmware update patch to the SMM driver. As in step 620 shown in FIG. 12D, the staging GUID may be used as a temporary GUID during updating, and the primary GUID may replace the staging GUID after the SMM driver is updated.

Using the systems and methods described above, low-impact firmware updates that do not require rebooting may be performed at a computing system. These firmware updates may be modular updates that replace only a portion of the BIOS of the computing system rather than the entire BIOS. In addition, the firmware updating processes described above may be version-aware in order to prevent redundant or incompatible updates. The systems and methods discussed above may also prevent malicious code from being inserted into the firmware during firmware updates by performing a first verification check and a second verification check.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
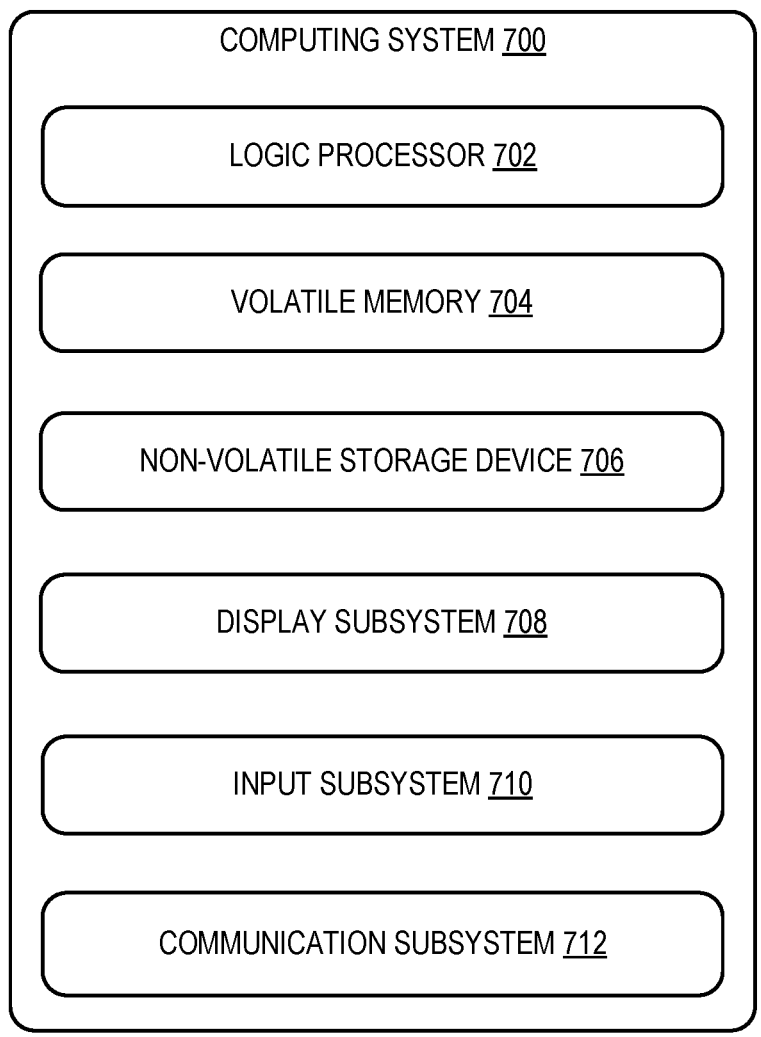
FIG. 13 shows a schematic view of an example computing environment in which the computing system of FIG. 1 may be enacted.

FIG. 13 schematically shows a non-limiting embodiment of a computing system 700 that can enact one or more of the methods and processes described above. Computing system 700 is shown in simplified form. Computing system 700 may embody the computing system 10 described above and illustrated in FIG. 1. Computing system 700 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 13.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

According to one aspect of the present disclosure, a computing system is provided, including a processor and memory. The memory may store instructions that, when executed, cause the processor to store a firmware update patch in a runtime buffer included in the memory. The runtime buffer may be accessible by firmware and an operating system of the computing system. The instructions may further cause the processor to perform a first verification check on the firmware update patch stored in the runtime buffer. When the firmware update patch passes the first verification check, the instructions may further cause the processor to copy the firmware update patch to an SMRAM buffer included in the memory. The SMRAM buffer may be accessible by the firmware and inaccessible by the operating system. The instructions may further cause the processor to perform a second verification check on the copy of the firmware update patch stored in the SMRAM buffer. When the copy of the firmware update patch passes the second verification check, the instructions may further cause the processor to execute the copy of the firmware update patch.

According to this aspect, the firmware update patch may be a URP capsule including a firmware volume, a URP capsule manifest header, a platform public key, and a patch signature.

According to this aspect, the first verification check may be performed on at least the platform public key. The second verification check may be performed on at least a copy of the platform public key included in the copy of the firmware update patch.

According to this aspect, the first verification check may be performed on at least the patch signature. The second verification check may be performed on at least a copy of the patch signature included in the copy of the firmware update patch.

According to this aspect, the memory may further store instructions that, when executed, cause the processor to store a firmware patch version indicator in the memory.

According to this aspect, the first verification check may be further performed on the firmware patch version indicator. The instructions, when executed, may cause the processor to determine that the firmware update patch passes the first verification check at least in part by determining that a firmware version indicated by the firmware patch version indicator is more recent than a currently installed firmware version.

According to this aspect, at least one of the first verification check and the second verification check may include a determination of an available capacity of the SMRAM buffer. The instructions, when executed, may cause the processor to determine that the firmware update patch passes the at least one of the first verification check and the second verification check at least in part by determining that the available capacity of the SMRAM buffer is larger than a file size of the firmware update patch.

According to this aspect, the firmware update patch may be an update to an SMM driver having a primary GUID.

According to this aspect, the first verification check, the copying of the firmware update patch to the SMRAM buffer, and the second verification check may be performed at an SMM core. The memory may further store instructions that, when executed, cause the processor to execute an SMM helper configured to apply the copy of the firmware update patch to the SMM core to obtain an updated SMM core.

According to this aspect, the SMM helper may be configured to assign a staging GUID to the copy of the firmware update patch stored in the SMRAM buffer. The SMM helper may be further configured to reassign the primary GUID to the updated SMM core subsequently to applying the copy of the firmware update patch to the SMM core.

According to this aspect, the copy of the firmware update patch may be executed in a runtime SMM without rebooting the computing system.

According to another aspect of the present disclosure, a method for use with a computing system is provided. The method may include storing a firmware update patch in a runtime buffer included in memory. The runtime buffer may be accessible by firmware and an operating system of the computing system. The method may further include performing a first verification check on the firmware update patch stored in the runtime buffer. When the firmware update patch passes the first verification check, the method may further include copying the firmware update patch to a system management random access memory (SMRAM) buffer included in the memory. The SMRAM buffer may be accessible by the firmware and inaccessible by the operating system. The method may further include performing a second verification check on the copy of the firmware update patch stored in the SMRAM buffer. When the copy of the firmware update patch passes the second verification check, the method may further include executing the copy of the firmware update patch.

According to this aspect, the firmware update patch may be a URP capsule including a firmware volume, a URP capsule manifest header, a platform public key, and a patch signature.

According to this aspect, the first verification check may be performed on at least the platform public key. The second verification check may be performed on at least a copy of the platform public key included in the copy of the firmware update patch.

According to this aspect, the first verification check may be performed on at least the patch signature. The second verification check may be performed on at least a copy of the patch signature included in the copy of the firmware update patch.

According to this aspect, the method may further include storing a firmware patch version indicator in the memory. The first verification check may be further performed on the firmware patch version indicator. Determining that the firmware update patch passes the first verification check may include determining that a firmware version indicated by the firmware patch version indicator is more recent than a currently installed firmware version.

According to this aspect, the firmware update patch may be an update to an SMM driver having a primary GUID.

According to this aspect, the first verification check, the copying of the firmware update patch to the SMRAM buffer, and the second verification check may be performed at an SMM core. The method may further include executing an SMM helper configured to apply the copy of the firmware update patch to the SMM core to obtain an updated SMM core.

According to this aspect, executing the SMM helper may include assigning a staging GUID to the copy of the firmware update patch stored in the SMRAM buffer. The method may further include, subsequently to applying the copy of the firmware update patch to the SMM core, reassigning the primary GUID to the updated SMM core.

According to another aspect of the present disclosure, a computing system is provided, including a processor and memory. The memory may store instructions that, when executed, cause the processor to store a firmware update patch in a runtime buffer included in the memory. The runtime buffer may be accessible by firmware and an operating system of the computing system. At an SMM core having a primary GUID, the instructions may further cause the processor to copy the firmware update patch to an SMRAM buffer included in the memory. The SMRAM buffer may be accessible by the firmware and inaccessible by the operating system. The instructions may further cause the processor to execute the copy of the firmware update patch, wherein executing the copy of the firmware update patch includes, at an SMM helper, assigning a staging GUID to the copy of the firmware update patch stored in the SMRAM buffer. Executing the copy of the firmware update patch may further include applying the copy of the firmware update patch to the SMM core to obtain an updated SMM core. Executing the copy of the firmware update patch may further include reassigning the primary GUID to the updated SMM core.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor; and
memory storing instructions that, when executed, cause the processor to:
store a firmware update patch in a runtime buffer included in the memory, wherein the runtime buffer is accessible by firmware and an operating system of the computing system, the firmware update patch being an update to a driver having a primary globally unique identifier (GUID);
perform a first verification check on the firmware update patch stored in the runtime buffer;
when the firmware update patch passes the first verification check, copy the firmware update patch to a system management random access memory (SMRAM) buffer included in the memory, wherein the SMRAM buffer is accessible by the firmware and inaccessible by the operating system;
perform a second verification check on the copy of the firmware update patch stored in the SMRAM buffer;
assign a staging GUID to the copy of the firmware update patch stored in the SMRAM buffer;
when the copy of the firmware update patch passes the second verification check, execute the copy of the firmware update patch to update the driver and reassign the primary GUID to the updated driver.

2. The computing system of claim 1, wherein the firmware update patch is a Unified Extensible Framework Interface (UEFI) runtime patch (URP) capsule including a firmware volume, a URP capsule manifest header, a platform public key, and a patch signature.

3. The computing system of claim 2, wherein:
the first verification check is performed on at least the platform public key; and
the second verification check is performed on at least a copy of the platform public key included in the copy of the firmware update patch.

4. The computing system of claim 2, wherein:
the first verification check is performed on at least the patch signature; and
the second verification check is performed on at least a copy of the patch signature included in the copy of the firmware update patch.

5. The computing system of claim 1, wherein the memory further stores instructions that, when executed, cause the processor to store a firmware patch version indicator in the memory.

6. The computing system of claim 5, wherein:
the first verification check is further performed on the firmware patch version indicator; and
the instructions, when executed, cause the processor to determine that the firmware update patch passes the first verification check at least in part by determining that a firmware version indicated by the firmware patch version indicator is more recent than a currently installed firmware version.

7. The computing system of claim 1, wherein:
at least one of the first verification check and the second verification check includes a determination of an available capacity of the SMRAM buffer; and
the instructions, when executed, cause the processor to determine that the firmware update patch passes the at least one of the first verification check and the second verification check at least in part by determining that the available capacity of the SMRAM buffer is larger than a file size of the firmware update patch.

8. The computing system of claim 1, wherein the firmware update patch is an update to a system management mode (SMM) driver having the primary globally unique identifier (GUID).

9. The computing system of claim 8, wherein:
the first verification check, the copying of the firmware update patch to the SMRAM buffer, and the second verification check are performed at an SMM core; and
the memory further stores instructions that, when executed, cause the processor to execute an SMM helper configured to apply the copy of the firmware update patch to the SMM core to obtain an updated SMM core.

10. The computing system of claim 9, wherein the SMM helper is configured to:
assign the staging GUID to the copy of the firmware update patch stored in the SMRAM buffer; and
subsequently to applying the copy of the firmware update patch to the SMM core, reassign the primary GUID to the updated SMM core.

11. The computing system of claim 1, wherein the copy of the firmware update patch is executed in a runtime system management mode (SMM) without rebooting the computing system.

12. A method for use with a computing system, the method comprising:
storing a firmware update patch in a runtime buffer included in memory, wherein the runtime buffer is accessible by firmware and an operating system of the computing system, the firmware update patch being an update to a driver having a primary globally unique identifier (GUID);
performing a first verification check on the firmware update patch stored in the runtime buffer;
when the firmware update patch passes the first verification check, copying the firmware update patch to a system management random access memory (SMRAM) buffer included in the memory, wherein the SMRAM buffer is accessible by the firmware and inaccessible by the operating system;
performing a second verification check on the copy of the firmware update patch stored in the SMRAM buffer; and
assigning a staging GUID to the copy of the firmware update patch stored in the SMRAM buffer;
when the copy of the firmware update patch passes the second verification check, executing the copy of the firmware update patch to update the driver and reassign the primary GUID to the updated driver.

13. The method of claim 12, wherein the firmware update patch is a Unified Extensible Framework Interface (UEFI) runtime patch (URP) capsule including a firmware volume, a URP capsule manifest header, a platform public key, and a patch signature.

14. The method of claim 13, wherein:
the first verification check is performed on at least the platform public key; and
the second verification check is performed on at least a copy of the platform public key included in the copy of the firmware update patch.

15. The method of claim 13, wherein:
the first verification check is performed on at least the patch signature; and
the second verification check is performed on at least a copy of the patch signature included in the copy of the firmware update patch.

16. The method of claim 12, further comprising storing a firmware patch version indicator in the memory, wherein:
the first verification check is further performed on the firmware patch version indicator; and
determining that the firmware update patch passes the first verification check includes determining that a firmware version indicated by the firmware patch version indicator is more recent than a currently installed firmware version.

17. The method of claim 12, wherein the firmware update patch is an update to a system management mode (SMM) driver having the primary globally unique identifier (GUID).

18. The method of claim 17, wherein:
the first verification check, the copying of the firmware update patch to the SMRAM buffer, and the second verification check are performed at an SMM core; and
the method further comprises executing an SMM helper configured to apply the copy of the firmware update patch to the SMM core to obtain an updated SMM core.

19. The method of claim 18, wherein executing the SMM helper includes:
assigning the staging GUID to the copy of the firmware update patch stored in the SMRAM buffer; and
subsequently to applying the copy of the firmware update patch to the SMM core, reassigning the primary GUID to the updated SMM core.

20. A computing system comprising:
a processor; and
memory storing instructions that, when executed, cause the processor to:
store a firmware update patch in a runtime buffer included in the memory, wherein the runtime buffer is accessible by firmware and an operating system of the computing system;
at a system management mode (SMM) core having a primary globally unique identifier (GUID), copy the firmware update patch to a system management random access memory (SMRAM) buffer included in the memory, wherein the SMRAM buffer is accessible by the firmware and inaccessible by the operating system; and
execute the copy of the firmware update patch, wherein executing the copy of the firmware update patch includes, at an SMM helper:
assigning a staging GUID to the copy of the firmware update patch stored in the SMRAM buffer;
applying the copy of the firmware update patch to the SMM core to obtain an updated SMM core; and
reassigning the primary GUID to the updated SMM core.

* * * * *